United States Patent
Kaise et al.

(10) Patent No.: US 6,330,112 B1
(45) Date of Patent: Dec. 11, 2001

(54) OPTICAL MODULATOR AND IMAGE PROJECTION DISPLAY APPARATUS

(75) Inventors: Kikuo Kaise; Shizuo Nishihara, both of Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/295,381

(22) Filed: Apr. 21, 1999

(30) Foreign Application Priority Data

Apr. 27, 1998 (JP) .................................................. 10-117329

(51) Int. Cl.⁷ ...................................................... G02B 27/10
(52) U.S. Cl. ............................................ 359/621; 359/622
(58) Field of Search ..................................... 359/618, 619, 359/620, 621, 622, 624

(56) References Cited

U.S. PATENT DOCUMENTS

| | | | |
|---|---|---|---|
| 5,161,042 | 11/1992 | Hamada | 349/62 |
| 5,508,834 * | 4/1996 | Yamada et al. | 359/83 |
| 5,550,656 * | 8/1996 | Sprague et al. | 359/40 |
| 5,737,113 | 4/1998 | Kuramochi et al. | 359/259 |
| 5,757,341 * | 5/1998 | Clarke et al. | 345/32 |
| 5,764,318 * | 6/1998 | Kurematsu et al. | 349/5 |
| 5,798,805 * | 8/1998 | Ooi et al. | 349/10 |
| 5,844,644 * | 12/1998 | Oh et al. | 349/95 |
| 5,894,359 * | 4/1999 | Suzuki et al. | 359/15 |
| 5,902,031 * | 5/1999 | Urabe | 353/31 |
| 5,990,992 * | 11/1999 | Hamanaka et al. | 349/95 |
| 6,002,459 * | 12/1999 | Kaise et al. | 349/95 |
| 6,246,526 * | 6/2001 | Okuyama | 359/621 |

FOREIGN PATENT DOCUMENTS

| | | |
|---|---|---|
| 0758100 A2 | 2/1997 | (EP) . |
| 4-60538 | 2/1992 | (JP) . |
| 09090310 | 4/1997 | (JP) . |
| 09160011 | 6/1997 | (JP) . |

OTHER PUBLICATIONS

Patent Abstract of Japan, No. 09105899 dated Apr. 22, 1997; Projection Type Display Device "Asia Display '95," Proceedings of the Fifteenth International Display Research Conference, Oct 16–18, 1995, pp. 887–890.

* cited by examiner

*Primary Examiner*—Georgia Epps
*Assistant Examiner*—Saeed Seyrafi
(74) *Attorney, Agent, or Firm*—Ronald P. Kananen; Rader, Fishman & Grauer PLLC

(57) ABSTRACT

The invention enables a sufficiently bright color image to be displayed without increasing a heating value with a simple and compact structure which is easily assembled and adjusted. A first microlens for condensing light and a second microlens for changing the travel direction of light are provided, every three pixel electrode parts in a liquid crystal panel. The travel directions of B and G rays condensed by the first microlens are changed by the second microlens, thereby allowing the principal rays to perpendicularly enter the pixel electrode part. The color ray passing through the second microlens focuses on the corresponding pixel electrode part. The first and second microlenses construct a relay optical system having the magnification of 1. Light reflected by the pixel electrode part is transformed by the same first microlens into a parallel ray bundle, and the ray bundle goes out from the liquid crystal panel. The outgoing light of each color ray from the liquid crystal panel is directed toward the incident direction.

18 Claims, 16 Drawing Sheets

OPTICAL MODULATOR AND IMAGE PROJECTION DISPLAY APPARATUS

BACKGROUND OF THE INVENTION

1. Field of the Invention

The present invention relates to an optical modulator capable of modulating light pixel by pixel in accordance with a picture signal and enabling an image to be displayed. More particularly, the invention relates to an optical modulator which can perform color display by using only a single panel and an image projection display apparatus using the optical modulator.

2. Description of the Related Art

An image display system using an optical modulator such as a liquid crystal device takes the form of not only a direct vision display but also an image projection display apparatus such as a liquid crystal projector for performing display by projecting an image on a screen. The image projection display apparatus displays a color image by leading three colored rays used for color display to pixels corresponding to the respective colors of the optical modulator, modulating the light in accordance with a picture signal, and projecting the resultant light onto a screen. Image projection display apparatus each using a liquid crystal display device (hereinbelow, referred to as a liquid crystal panel) as an optical modulator are broadly divided into two types; a single-panel type constructed by using a single liquid crystal panel having color separating means for separating light to colored rays of red (R), green (G), and blue (B), and a triple-panel type constructed by using three liquid crystal panels in total having no color separating means arranged in respective paths of the colored rays of R, G, and B.

Since the triple-panel type display needs three liquid crystal panels for R, G, and B, the costs are high. Besides the liquid crystal panels for the respective colors, relatively large sized prism, mirror, and the like for synthesizing images of the colors formed by using the panels are necessary. Consequently, a vein space is produced in the system and it is accordingly difficult to make the system compact. It is not easy to adjust positions and angles of the three liquid crystal panels at the time of arrangement. Further, even if one of the three liquid crystal panels has an uneven gap (unevenness in thickness of a liquid crystal layer), brightness unevenness occurs in a synthesized image displayed which causes color irregularity. It is therefore necessary to strictly keep the gap uniform with respect to all of the liquid crystal panels, so that it is difficult to manufacture the triple-panel type display system.

For this reason, recently, attention is being paid to the single-panel type image projection display apparatus. The single-panel type image projection display apparatus separates light emitted from a white light source into rays of three primary colors of red, green, and blue by color separating means provided on the liquid crystal panel, allows the colored rays to enter pixels (liquid crystal cells) for the respective colors which are regularly arranged, spatially modulates the incident colored rays in accordance with respective picture signals, and transmits and outputs the resultant light. As the color separating means in this case, a color filter or the like is conventionally used. Although the display using the color filter has a simple structure and can be easily made small and light at low costs, on the other hand, since the heat generating amount by light absorption of the color filter is large, it is difficult to achieve high brightness. In this case, since it is indispensable to sufficiently cool the liquid crystal panel, the construction is complicated and the size is large.

For dealing with the problem, a single-panel type color liquid crystal display system which can perform color display without using a color filter (hereinbelow, referred to as a color-filterless single-panel type color liquid crystal display system) has been proposed in, for example, Japanese Patent Application Laid-open No. 4-60538 or "Asia Display '95, p887". In the system, a condenser microlens is disposed facing every three pixels. Three colored rays of B, R, and G are allowed to enter each microlens from mutually different directions and condensed. The outgoing rays from the microlens are allowed to enter pixels corresponding to the three colors of B, R, and G. Since a color filter is not employed, just a small amount of light is absorbed and light entering a region between pixels (i.e., a black matrix region in which a switching device for driving pixels is formed) can be also effectively utilized. The substantial aperture ratio is therefore increased and the brightness level is accordingly increased. The aperture ratio denotes the ratio of the total area of display pixels to the effective display area.

In the above-mentioned color-filterless single-panel type display system, however, since a transmission type liquid crystal panel is used, the display pixel area (almost equal to the part occupied by the pixel electrodes) and the black matrix area are not permitted to overlap one another. Consequently, the existence of the black matrix area reduces the aperture ratio and hinders realization of high brightness after all.

Since the transmission type liquid crystal panel is used in the conventional color-filterless single-panel type color liquid crystal display system using the microlenses, it is difficult to further improve the aperture ratio.

SUMMARY OF THE INVENTION

The present invention has been achieved in view of the above problems and its object is to provide an optical modulator having a simple and compact construction, which is easily assembled and adjusted and can display a sufficiently bright color image without increasing a heating value, and an image projection display apparatus using the optical modulator.

An optical modulator of the invention comprises: a plurality of pixel electrodes two-dimensionally arranged in correspondence with a plurality of colored rays and formed so as to be capable of reflecting incident light; condensing means which is disposed in a position facing every group of the pixel electrodes arranged in correspondence with the plurality of colored rays and condenses colored rays entering from different directions into directions corresponding to the incident directions; travel direction changing means for changing the travel direction of each color ray condensed by the condensing means so that the principal ray becomes perpendicular to the reflection surface of the pixel electrode and allowing the color ray to go out and enter the corresponding pixel electrode; and light modulating means for modulating each color ray going out from the travel direction changing means and reflected by the pixel electrode, in accordance with a picture signal applied to the pixel electrode. In this case, the condensing means may take the form of the first lens and the travel direction changing means may take the form of the second lens. The distance between the first and second lenses may be substantially equal to the focal distance of the second lens, and a synthetic focal point of the first and second lenses may be set on or near the pixel electrode. The travel direction changing means may take the form of a prism which enables each color ray condensed by the condensing means to focus on or near the pixel electrode for the corresponding color ray.

In this case, the principal ray denotes a ray in the center of an oblique ray bundle. The oblique ray bundle indicates a ray which is not in parallel to the optical axis among meridional rays. The meridional rays denote rays in the plane including the optical axis. The description hereinbelow will follow the definition.

An image projection display apparatus of the invention comprises: color ray generating means for generating a plurality of colored rays; an optical modulator for reflecting colored rays emitted from the color ray generating means and performing an optical modulation to each of the colored rays in accordance with a picture signal; and projecting means for projecting each of the colored rays reflected and modulated by the optical modulator onto a screen. The optical modulator comprises: a plurality of pixel electrodes two-dimensionally arranged in correspondence with the plurality of colored rays and formed so as to be capable of reflecting incident light; condensing means which is disposed in a position facing every group of pixel electrodes arranged in correspondence with the plurality of colored rays and condenses colored rays entering from different directions into directions corresponding to the incident directions; travel direction changing means for changing the travel direction of each color ray condensed by the condensing means so that the principal ray of the color ray becomes perpendicular to the reflection surface of the pixel electrode and allowing the color ray to go out and enter the corresponding pixel electrode; and light modulating means for modulating each color ray going out from the travel direction changing means and reflected by the pixel electrode, in accordance with a picture signal applied to the pixel electrode. In this case, the condensing means may take the form of a first lens and the travel direction changing means of the optical modulator may take the form of a second lens. The distance between the first and second lenses is almost equal to a focal distance of the second lens, and a synthetic focal point of the first and second lenses is on or near the pixel electrode. The travel direction changing means may take the form of a prism which enables each of colored rays condensed by the condensing means to focus on or near the pixel electrode for the corresponding color ray.

In the optical modulator or the image projection display apparatus of the invention, each of colored rays entering the condensing means provided every plurality of pixel electrodes from mutually different directions is condensed in the direction corresponding to the incident direction. Further, the travel direction is changed so that the principal ray becomes perpendicular to the reflection surface of the pixel electrode and the color ray is allowed to enter the corresponding pixel electrode. The color ray incident on the pixel electrode is reflected. During the period, the color ray is modulated by the light modulating means in accordance with a picture signal applied to the pixel electrode. In this case, the direction of the principal ray of the reflected ray bundle substantially coincides with the direction of the principal ray of the incident ray bundle.

Especially, in the case where the condensing means and the travel direction changing means are constructed by the first and second lenses, the distance between the first and second lenses is almost equal to the focal distance of the second lens and the synthetic focal point of the first and second lenses is on or near the pixel electrode, or in the case where the travel direction changing means is constructed by the prism which enables each color ray condensed by the condensing means to focus on or near the pixel electrode for the corresponding color ray, the condensing means and the travel direction changing means construct a relay optical system. The color ray reflected from the pixel electrode travels backward along an optical path substantially the same as the incident optical path of another ray which is incident symmetrical with the incident ray with respect to the principal ray and goes out.

Other and further objects, features and advantages of the invention will appear more fully from the following description.

DETAILED DESCRIPTION OF THE PREFERRED EMBODIMENTS

Embodiments of the invention will be described in detail hereinbelow with reference to the drawings.
[First Embodiment]

Figure 1:
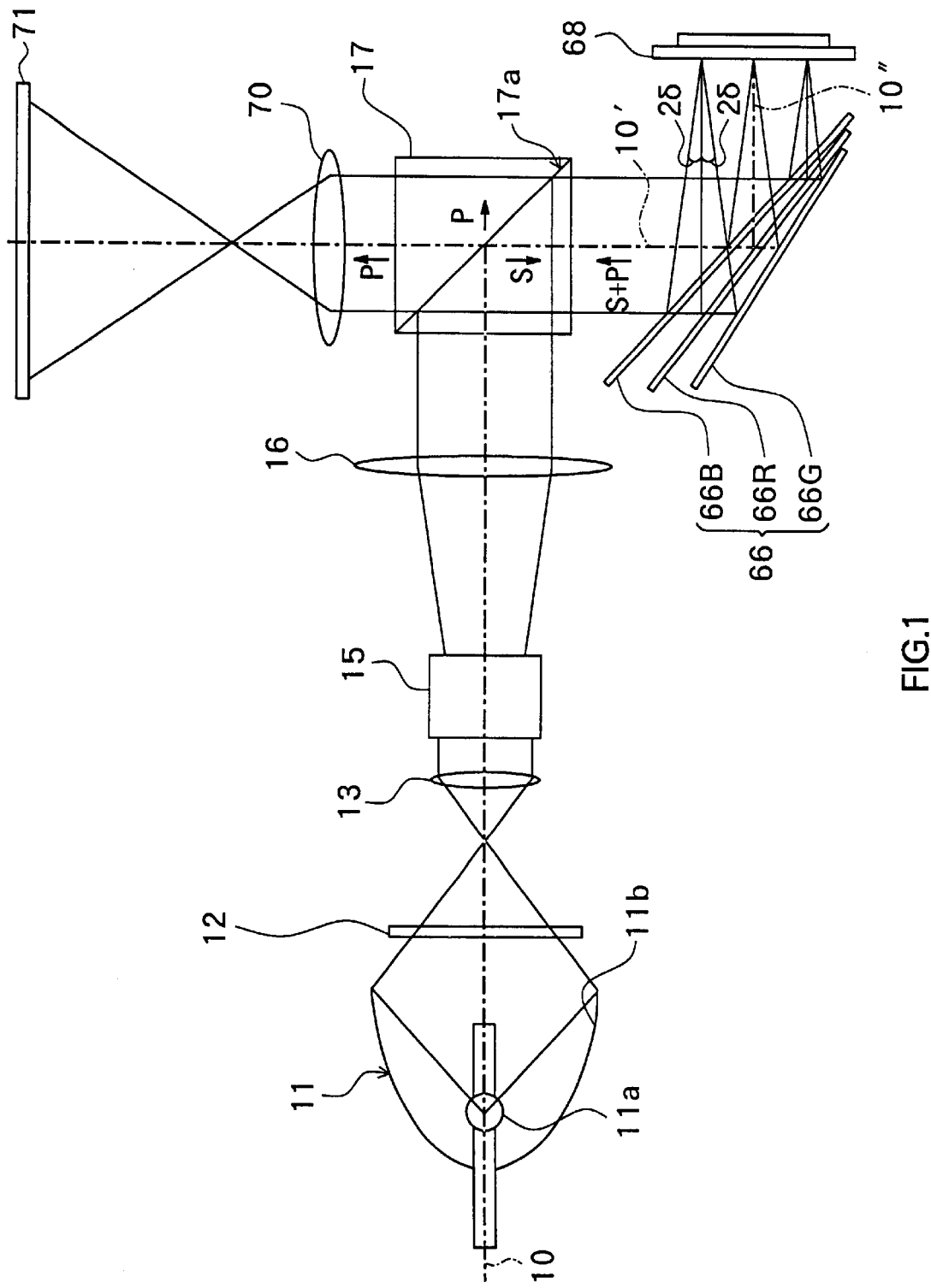
FIG. 1 is a plan view of the whole construction of an optical system of an image projection display apparatus according to an embodiment of the invention.

FIG. 1 shows a schematic construction of the optical system of an image projection display apparatus according to a first embodiment of the invention when the system is seen from overhead. In FIG. 1, for simplicity, only paths of main rays of light are shown while the others are omitted. The system takes the form of a color-filterless single-panel reflection type image projection display apparatus using microlenses and comprises: a light source 11 for emitting white light; a UV/IR cut filter 12 which is made of, for example, quartz glass on which a multilayer film is deposited and eliminates ultraviolet and infrared rays from the white light emitted from the light source 11; a collimator lens 13 made of glass or the like for transforming light which diverges after passing through the UV/IR cut filter 12 into a nearly parallel ray bundle; an integrator 15 made of glass or the like for uniforming the intensity distribution in a cross section of a bundle of rays transmitted from the collimator lens 13; and a condenser lens 16 made of glass or the like for condensing the divergent light from the integrator 15.

The light source 11 comprises an emitter 11a and a concave mirror 11b which is made of Al or the like and has rotation symmetry. A metal-halide lamp, for example, may be used as the emitter 11a. A mirror with the shape that maximally condenses light is preferred as the concave mirror 11b. For example, a spheroidal mirror or a paraboloidal mirror is used. The integrator 15 diffuses the white light emitted from the light source 11 and uniforms the illuminance distribution in the plane of a liquid crystal panel 68 which will be described hereinlater. For example, the integrator 15 comprises a pair of lens arrays (fly's eye lenses) in which a number of microlenses are arranged, a glass rod, or the like.

The image projection display apparatus further comprises: a polarization beam splitter 17 (hereinbelow, simply described as "PBS") which is constructed by, for example, an optical prism on which a multilayer film is deposited, and provided on an optical path backward of the condenser lens 16; dichroic mirrors 66B, 66R, and 66G which are made of, for example, glass on which a multilayer film is deposited and sequentially provided on an optical path along an optical axis 10' crossing almost perpendicularly to an optical axis 10 which is common to the above optical members; the liquid crystal panel 68 disposed so as to be perpendicular to an optical axis 10" which crosses almost perpendicularly to the optical axis 10'; and a projection lens 70 which is made of glass or the like and provided on the side opposite to the dichroic mirrors 66B, 66R, and 66G with respect to the PBS 17.

The PBS 17 has a polarization separation face 17a disposed at an angle of about 45 degrees from the optical axis 10. The polarization separation face 17a reflects only s-polarized light component in the ray bundle which is sent through the condenser lens 16 and is almost parallel to the optical axis 10 in the right-angle direction which is almost orthogonal to the optical axis 10 (direction almost parallel to the optical axis 10') and transmits p-polarized light component as they are. The p-polarized light component denote linearly polarized light such that the vibration direction of the electric vector of light entering the polarization separation face 17a of the PBS 17 is included in the plane of incidence (plane including the normal line of the polarization separation face 17a and the wave normal (light travelling direction)). The s-polarized light component denotes linearly polarized light such that the vibration direction of the electric vector of light entering the polarization separation face 17a of the PBS 17 is orthogonal to the plane of incidence.

The dichroic mirror 66 R is sandwiched between the dichroic mirrors 66B and 66G. The dichroic mirrors 66B and 66G are adjusted to form very small angles (set to δ in this case) against the dichroic mirror 66R, respectively. The dichroic mirrors 66B and 66G have the function of selectively reflecting the s-polarization ray bundle from the PBS 17, separating the ray bundle into colored rays of B, R and G, and allowing the colored rays to enter the liquid crystal panel 68 at different angles. In the example, the dichroic mirrors 66B, 66R, and 66G are arranged so that the R ray perpendicularly enters the liquid crystal panel 68 and the B and G rays enter the liquid crystal panel 68 at angles of (+2) and (−2) from the R ray respectively. They can be also arranged in such a manner that the light perpendicularly entering the liquid crystal panel 68 is the B ray (or G ray) and the rays entering at the angles of (+2) and (−2) respectively, from the perpendicular direction are the R and G rays (or R and B rays). The dichroic mirrors 66B, 66R, and 66G correspond to an example of "color ray generating means" of the invention.

The liquid crystal panel 68 is a reflection type color-filterless liquid crystal display device using microlenses. The liquid crystal panel 68 reflects the colored rays reflected from the dichroic mirrors 66B, 66R, and 66G and performs selective modulation to the respective colored rays in accordance with picture signals. As the liquid crystal panel 68, for example, a liquid crystal panel which operates in a so-called electric field control birefringence (ECB) mode can be used. As will be described hereinlater, the liquid crystal panel 68 comprises a pixel substrate (not shown) on which pixel electrodes (not shown in FIG. 1) are regularly two-dimensionally arranged in correspondence with the colors of B, R, and G, a counter substrate (not shown) disposed so as to face the pixel substrate, and a liquid crystal layer (not shown) sandwiched by the pixel substrate and the counter substrate. The liquid crystal panel 68 corresponds to an example of the "light modulating device" in the invention. The structure of the liquid crystal panel 68 will be described in detail hereinlater.

The projection lens 70 made of glass or the like is to converge the p-polarized light which has transmitted the PBS 17 among the colored rays reflected from the liquid crystal panel 68 and the dichroic mirror 66 and project the light onto a screen 71. The projection lens 70 is disposed so that its focal point coincides with the reflection face of the liquid crystal panel 68, and the liquid crystal panel 68 and the screen 71 are in a conjugate relationship. The projection lens 70 corresponds to an example of "projecting means" in the invention.

With respect to the respective optical elements shown in FIG. 1, the direction orthogonal to the optical axes 10, 10', and 10" on the drawing sheet is called a horizontal direction and the direction orthogonal to the sheet is called a vertical direction. This definition applies to the following description as well.

Figure 2:
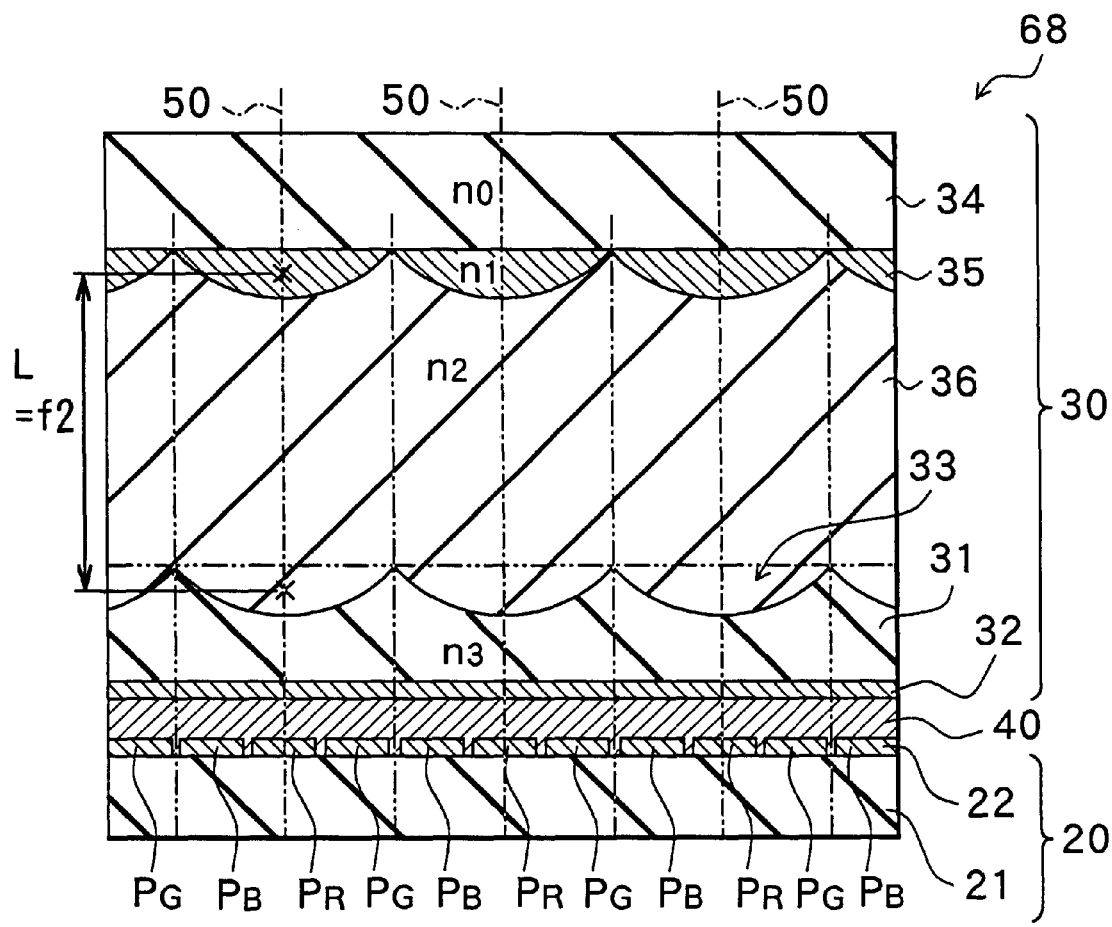
FIG. 2 is a cross section of the structure of the main part of a liquid crystal panel shown in FIG. 1.
Figure 3:
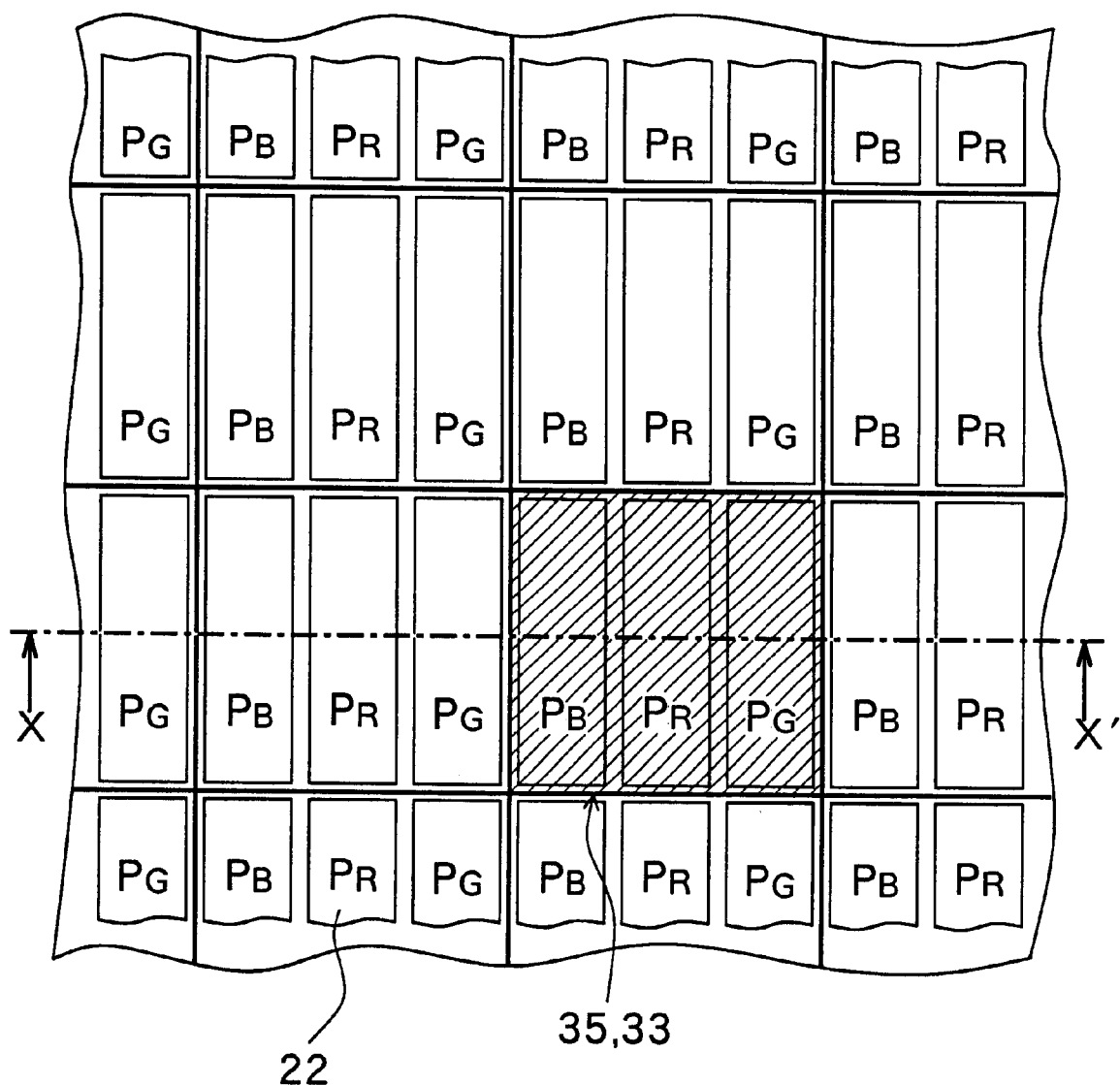
FIG. 3 is a plan view showing the structure of the main part of the liquid crystal panel shown in FIG. 1.

FIG. 2 is a schematic cross section of the liquid crystal panel 68 in FIG. 1. FIG. 3 is a plan view showing the structure of the liquid crystal panel 68. FIG. 2 corresponds to an example of the cross section taken along the line X–X' in FIG. 3. As shown in the drawings, the liquid crystal panel 68 comprises a pixel substrate 20, a counter substrate 30 which is disposed so as to face the front face (light incident face) of the pixel substrate 20 with a predetermined distance, and a liquid crystal layer 40 made of, for example, a nematic liquid crystal sandwiched by the pixel substrate 20 and the counter substrate 30. Mainly, the liquid crystal layer 40 corresponds to an example of "light modulating means" of the invention.

In the following description, it is assumed that the front face side denotes the light incident face side and the rear face side indicates the light outgoing face side.

The pixel substrate 20 has a glass substrate 21, a number of pixel electrode parts 22 made of Al or the like regularly (periodically) arranged in contact with the liquid crystal layer 40 on the front face side of the glass substrate 21, and a black matrix part (not shown) in which switching devices, wiring, and the like for applying a picture signal voltage to each of the pixel electrode parts 22 are formed. As the switching device, for example, a thin film transistor (TFT) is used. Each of the pixel electrode parts 22 is formed as a reflection electrode for reflecting incident light on the surface. In the embodiment, the pixel electrode parts 22 each having a strip shape as shown in FIG. 3 are arranged in stripes. Each of the pixel electrode parts 22 is allocated to either the color ray of B, R, or G. When the pixel electrode parts 22 for the colored rays of B, R, and G are referred to as PB, PR, and PG, respectively, the pixel electrode parts 22 are arranged in an order that PB, PR, and PG are repeated along one direction (in the drawing, the direction from the right to the left) as shown in FIGS. 2 and 3. The detailed structure of each pixel electrode part 22 will be described hereinlater.

The counter substrate 30 has a glass substrate 34, a plurality of microlenses 35 made of an organic resin or the like formed on the rear face side of the glass substrate 34, and a transparent resin layer 36 made of an organic resin or the like formed on the rear face side of the microlenses 35. In a part of the rear face side of the resin layer 36, a plurality of microlenses 33 are formed. On the rear face side of the resin layer 36, another transparent resin layer 31 made of an organic resin or the like is formed. The rear face side of the resin layer 31 is polished by, for example, CMP (chemical mechanical polishing) and counter electrodes 32 made of ITO (Indium Tin Oxide) or the like are formed on the resin layer 31. In this case, in order to enhance the adhesion of the counter electrode 32 to the resin layer 31, a transparent silicon dioxide film or the like and the counter electrode 32 can be sequentially formed on the resin layer 31. The microlens 35 corresponds to an example of the "condensing means" and "first lens" and the microlens 33 corresponds to an example of the "travel direction changing means" and "second lens" of the invention.

The counter electrode 32 is formed by, for example, a transparent conductive film made of ITO or the like and fixed at a predetermined potential (for example, ground potential). The microlenses 35 are condenser lenses each formed for a set of the three pixel electrode parts PB, PR, and PG. In the example of FIG. 2, each microlens 35 is formed so as to protrude to the rear face side of the glass substrate 34 and takes the form of a plano-concave lens having a flat face on the front face side and a concave face on the rear face side. On the other hand, the microlenses 33 serve as lenses for changing the travel direction, each of which is formed for the set of the three pixel electrode parts PB, PR, and PG (that is, in correspondence with one microlens 35). In the example of FIG. 2, the microlens 33 is integrally formed as a part of the resin layer 31 as mentioned above and takes the form of a plano-concave lens having a flat face on the front face side and a concave face on the rear face side in a manner similar to the microlens 35.

The microlens 33 can be also additionally formed on the glass substrate 34 by using a resin according to, for example, a stamper method which is similar to that of making a CD-ROM (a read only CD). The resin layer 31 can be formed by, for instance, injection molding. The resin layer 36 can be formed as a resin layer for adhesion for adhering the glass substrate 34 on which the microlenses 35 are formed and the resin layer 31. The resin layer 36 can be also formed by other methods. For example, a glass substrate is used in place of the resin layer 31 and concaves constructing the microlenses 33 are formed on the front face of the glass substrate by dry etching, wet etching, or the like. It is also possible to use a glass substrate in place of the resin layer 36 and form concaves constructing the microlenses 33 and 35 on the front and rear faces of the glass substrate by dry etching, wet etching, or the like. A quartz substrate or the like can be used in place of the glass substrate 34.

The microlenses 33 and 35 are arranged so that each of their optical axes extends to pass the center of each pixel electrode 12. Each of the microlenses 33 and 35 has a convex face of a spherical surface or an aspheric surface close to the spherical surface as shown in FIG. 2. As shown in FIG. 3, the outline shape (plan view) of the microlens is rectangular corresponding to an area occupied by the three pixel electrode parts PB, PR, and PG. A distance L (strictly, a distance between the principal points of the microlenses) between the microlenses 35 and 33 is set to be equal to a focal distance f2 of the microlens 33 for changing the travel direction as shown in FIG. 2 so that the colored rays going out from the microlens 33 perpendicularly enter the pixel electrode parts 12. Further, the synthetic focal point of a lens system in which the microlenses 35 and 33 are combined is set to coincide with the reflection face of the pixel electrode parts 22.

The distance L between the microlenses 35 and 33 is set so as to satisfy the following equation (1):

$$L \times \tan(2\delta) = p \qquad (1)$$

where, p denotes an arrangement pitch of the pixel electrode parts 22.

Each of the microlenses 35 and 33 is constructed to have the condensing capability. Specifically, the following equation (2) is satisfied:

$$n1 > n0,\ n1 > n2 > n3 \qquad (2)$$

where, n0, n1, n2, and n3 are refractive indices of the glass substrate 34, the microlens 35 and the resin layers 36 and 31, respectively.

Figure 5:
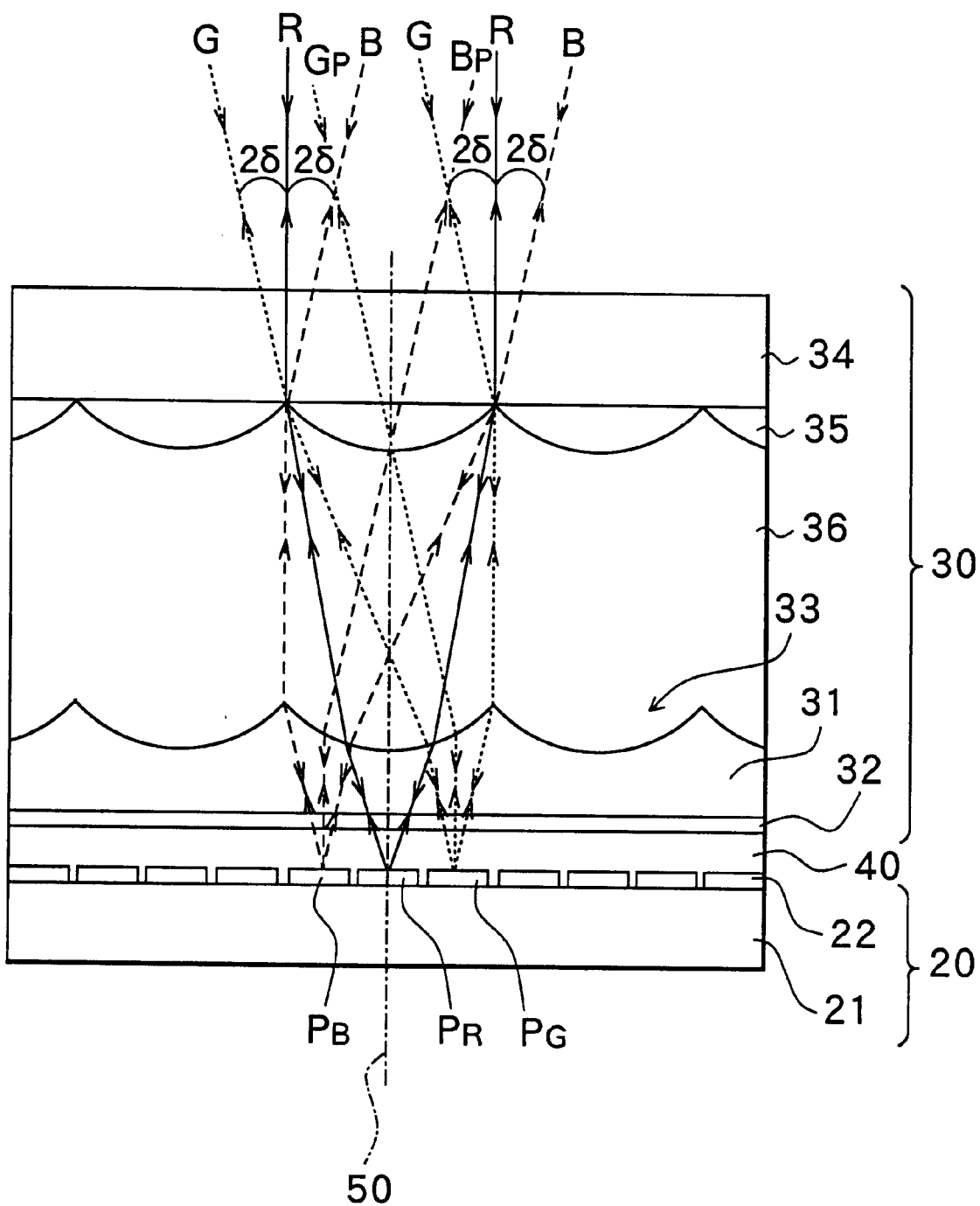
FIG. 5 is a diagram for explaining the general operation of the liquid crystal panel shown in FIG. 1.

As shown in FIG. 5, the three ray bundles of B, G, and R obtained from the white light by the color separation using the dichroic mirrors 66B, 66R, and 66G (FIG. 1) enter the microlens 35 from different directions. In the embodiment, as shown in the diagram, the R ray perpendicularly enters the liquid crystal panel 68 from the direction parallel to the optical axis 50 of the microlens 35. The B ray enters the liquid crystal panel 68 at an angle of 2δ to the optical axis 50 of the microlens 35. The G ray enters the liquid crystal panel 68 at an angle of 2δ to the optical axis 50 of the microlens 35 in the direction opposite to the B ray. In order to avoid complication, slashed lines indicative of a cross section are omitted in FIG. 5.

Figure 4:
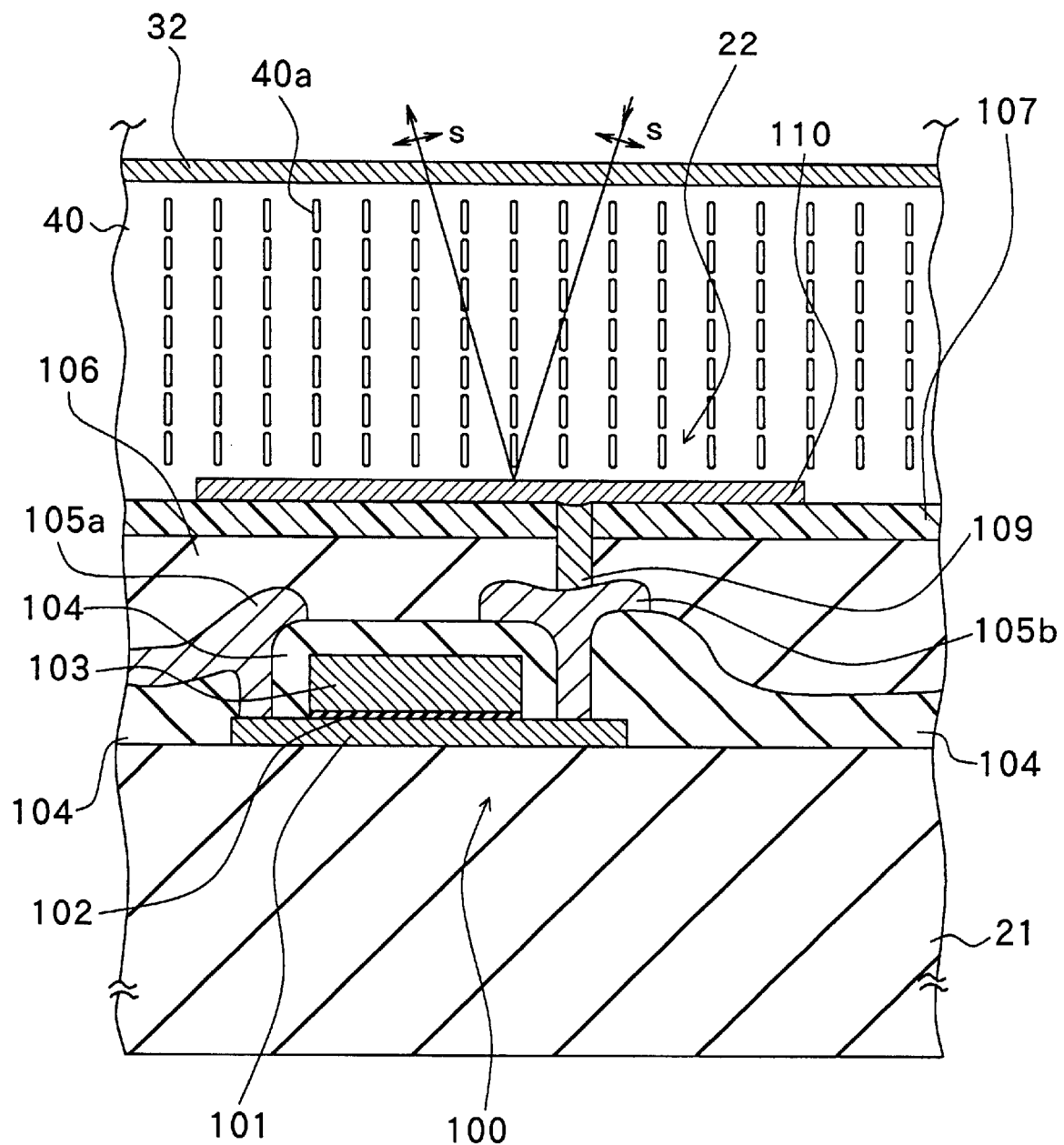
FIG. 4 is an enlarged cross section illustrating the structure of a part of a pixel electrode and its periphery in the liquid crystal panel shown in FIG. 2.

FIG. 4 is an enlarged cross section of the structure of the pixel electrode part 22 and its peripheral part in FIG. 2. As shown in FIG. 4, the pixel electrode part 22 includes a TFT 100 and a pixel electrode 110. The TFT 100 is selectively formed on the glass substrate 21 and comprises an active layer 101 made of polysilicon or the like functioning mainly as a channel region of the TFT 100, a gate insulating film 102 and a gate electrode 103 which are selectively sequentially deposited in an almost center region on the active layer 101, a drain electrode 105a connected to the drain region of the activate layer 101, and a source electrode 105b connected to the source region of the active layer 101. The gate electrode 103 is made of polysilicon, polysilicide, or the like doped with impurities. The gate insulating film 102 is made by a silicon oxide film (SiO2), a silicon nitride film (Si3N4) or the like. The drain electrode 105a and the source electrode 105b are made of aluminum or the like. The pixel electrode 110 corresponds to an example of the "pixel electrode" in the invention.

The gate structure comprising the active layer 101, the gate insulating film 102, and the gate electrode 103 is covered with an insulating layer 104 made of silicon oxide (SiO2) or the like. In the insulating layer 104, contact holes reaching the drain and source regions of the active layer 101 are formed and filled with the drain electrode 105a and the source electrode 105b. The insulating layer 104, the drain electrode 105a and the source electrode 105b are covered with a planarization layer 106 made by an insulating film or the like. On the whole surface of the planarization layer 106, for example, a photosensitive organic black layer 107 is formed. On the organic black layer 107, a pixel electrode 110 made of a metal having a high reflectance such as aluminum, gold (Au), silver (Ag), or the like is selectively formed. The pixel electrode 110 can be constructed by a metal layer having a lower reflectance and a layer having a higher reflectance made by a dielectric multilayer or the like which is deposited on the metal layer. The organic black layer 107 is provided to prevent erroneous operation of the TFT 100 caused when light enters the lower layer from the region where the pixel electrode 110 is not formed. The layer 107 is formed by using, for example, color mosaic CK-200 of Fuji Hunt Electronics Technology Co., Ltd, whose company name has changed to Fuji Film Olin Co., Ltd.

In the planarization layer 106 and the organic black layer 107, a contact hole penetrating the layers and reaching the top face of the source electrode 105b is formed. By a connection plug layer 109 made of aluminum (Al), tungsten (W), or the like embedded in the contact hole, the source electrode 105b and the pixel electrode 110 are electrically connected to each other. The drain electrode 105a is connected to a data line (not shown) and the gate electrode 103 is connected to an address line (not shown). A picture signal voltage of a corresponding color (B, R, or G) is applied to the pixel electrode selected by the combination of the lines.

Figure 6:
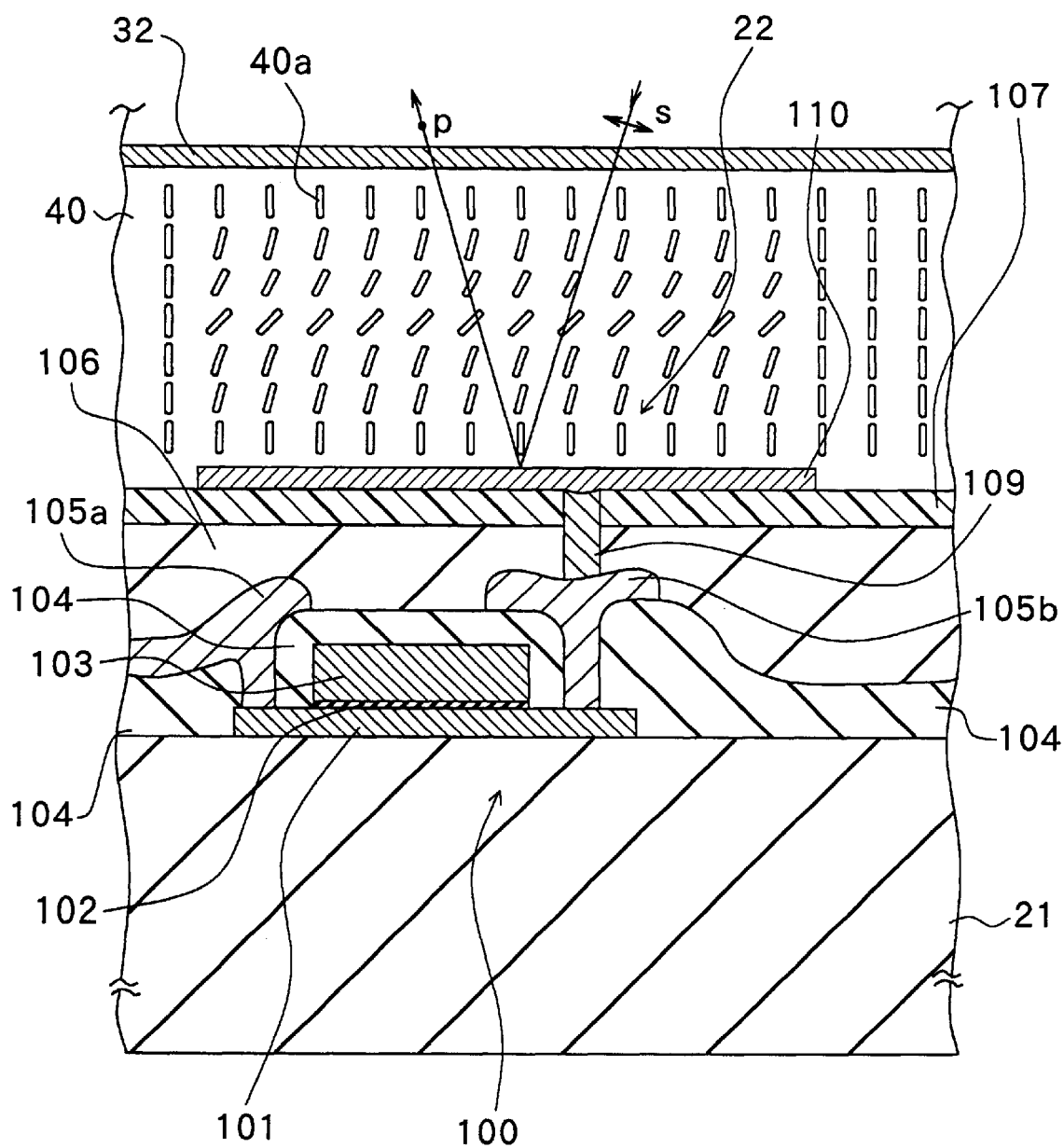
FIG. 6 is a diagram for explaining a partial operation of the liquid crystal panel shown in FIG. 1.

The liquid crystal layer 40 is deposited on the pixel electrode 110 and the counter electrode 32 is formed on the liquid crystal layer 40. In a state where no picture signal voltage is applied to the pixel electrode 110, as shown in FIG. 4, liquid crystal molecules 40a of the liquid crystal layer 40 are aligned so that the major axis is directed in the thickness direction of the liquid crystal layer 40 (that is, the direction perpendicular to the pixel electrode 110). In this state, as shown in the drawing, the incident s-polarized light passes through the liquid crystal layer 40, is reflected by the pixel electrode 110, and goes out again through the liquid crystal layer 40. During the period, the polarization direction is not rotated so that the s-polarized light goes out as it is. On the other hand, when the picture signal voltage is applied to the pixel electrode 110, the orientation of the liquid crystal molecules of the liquid crystal layer 40 in the region corresponding to the pixel electrode 110 to which the voltage is applied changes as shown in FIG. 6. Specifically, the liquid crystal molecules 40a are oriented in such a manner that the tilt angle of each of the liquid crystal molecules 40a in the central region in the thickness direction of the liquid crystal layer 40 becomes about 45 degrees and the tilt angle of the molecules 40a increases to 90 degrees toward the pixel electrode 110 or the counter electrode 32. In such a state, the polarization direction of the incident s-polarized light is turned by 90 degrees while the light makes a round trip in the liquid crystal layer 40 so that the light goes out as p-polarized light.

The operation of the image projection display apparatus having the above-described construction will now be described.

Referring to FIG. 1, the general operation of the image projection display apparatus will be described first. Ultra-violet and infrared rays of white light emitted from the light source 11 are cut by the UV/IR cut filter 12. The light is converged once, then diverges, and enters the collimator lens 13. The collimator lens 13 transforms the incident light into a ray bundle which is almost parallel to the optical axis 10. The ray bundle enters the integrator 15 and is subjected to a behavior of uniforming the intensity distribution in the cross section of the ray bundle. After that, the ray bundle goes out, diffuses, and enters the condenser lens 16. The condenser lens 16 condenses the incident ray bundle and transforms it into a tele-centric ray bundle which is nearly parallel to the optical axis 10.

The ray bundle which is made almost tele-centric by the condenser lens 16 enters the PBS 17. The p-polarized light components in the incident ray bundle travel straight through the polarization separation face 17a. The s-polarized light components are reflected from the polarization separation face 17a almost at a right angle and enter the dichroic mirrors 66B, 66R, and 66G along the optical axis 10'. The dichroic mirrors 66B, 66R, and 66G separate the incident s-polarized ray bundle into three colored rays of B, R, and G and reflect the colored rays at different angles. The colored rays obtained by the color separation by the dichroic mirrors 66B, 66R, and 66G and reflected enter the liquid crystal panel 68 from different directions. The incident colored rays of B and G form angles of 2δ in different directions with the color ray of R. When the colored rays of B, R, G are reflected, the liquid crystal panel 68 modulates every pixel in accordance with a picture signal and reflects a ray bundle in which the p-polarized and s-polarized light components are mixed. The p/s mixture ray bundle is reflected by the dichroic mirrors 66B, 66R, and 66G and enters the PBS 17. As shown in FIG. 1, at this stage, the color synthesis of the colored rays has already been finished. The polarization separation face 17a of the PBS 17 reflects the s-polarized light in the incident p/s mixture ray bundle towards the light source 11 and transmits the p-polarized light as it is. The (p) polarized ray bundle sent from the PBS 17 is condensed by the projection lens 70 and projected onto the screen 71, so that a color image is displayed on the screen 71.

Referring to FIGS. 4 to 6, the operation of the liquid crystal panel 68 will be described.

FIG. 5 shows loci of the respective colored rays entering the liquid crystal panel 68. As shown in the drawing, the R ray perpendicularly entering the liquid crystal panel 68 is condensed by the set of microlenses 35 and 33, passes through the liquid crystal layer 40, and focuses in the central part where the optical axis 50 of the pixel electrode part PR extends. At this time, the central beam of the incident R ray bundle perpendicularly enters the pixel electrode part PR and is reflected perpendicularly. Each of the incident beams other than the central beam is reflected by the pixel electrode part PR at an angle of reflection equal to the angle of incidence, travels backward along an optical path which is substantially the same as the optical path of incidence of another beam which enters symmetrically to the incident light with respect to the central beam, and goes out. The reflected beam pass through the same microlenses 33 and 35, become parallel light, and go out perpendicularly from the liquid crystal panel 68. The behavior is similar with respect to the R rays entering every microlens 35.

Meanwhile, the B ray entering the liquid crystal panel 68 at an angle of 2δ from the incidence direction of the R ray (that is, the direction of the optical axis 50) is condensed by the microlens 35. After that, the B ray is condensed by the microlens 33 corresponding to the microlens 35, simultaneously, the travel direction of the principal ray BP is changed, and the B ray focuses in an almost central part on the pixel electrode part PB. At this moment, the principal ray BP of the B ray enters the pixel electrode part PB almost perpendicularly and is reflected perpendicularly. Each of the incident rays except for the principal ray BP is reflected by the pixel electrode part PB at an angle of reflection equal to the angle of incidence, travels backward along the path which is almost the same as the optical path of another incident ray which enters symmetrical to the incident ray with respect to the principal ray BP, and goes out. The rays of reflection pass through the same microlenses 33 and 35, become parallel light, and go out in the same direction as the entering direction of the B ray from the liquid crystal panel 68. The behavior is similar with respect to the B rays entering every microlens 35.

The behavior of the G ray entering the liquid crystal panel 68 at an angle of 2δ from the incidence direction of the R ray (that is, the direction of the optical axis 50) is similar to the above. To be specific, the incident G ray is condensed by the microlens 35. After that, the G ray is condensed by the microlens 33 corresponding to the microlens 35, simultaneously, the travel direction of the principal ray GP is changed, and the G ray focuses in an almost central part on the pixel electrode part PG. At this moment, the principal ray GP of the G ray enters the pixel electrode part PG almost perpendicularly and is reflected perpendicularly. Each of the incident rays except for the principal ray GP is reflected by the pixel electrode part PG at an angle of reflection equal to the angle of incidence, travels backward along the path which is almost the same as the optical path of another incident ray which enters symmetrical to the incident ray with respect to the principal ray GP, and goes out. The rays of reflection pass through the same microlenses 33 and 35, become parallel light, and go out in the same direction as the entering direction of the G ray from the liquid crystal panel 68. The behavior is similar with respect to the G rays entering all the microlenses 35.

The polarization directions of the colored rays are selectively modulated in accordance with the picture signal voltages applied to the pixel electrode parts PB, PR, and PG while the colored rays make a round trip in the liquid crystal layer 40 of the liquid crystal panel 68. Specifically, as shown in FIG. 4, in a state where the picture signal voltage is not applied to the pixel electrode 110 of each of the pixel electrode parts PB, PR, and PG, the liquid crystal molecules 40a of the liquid crystal layer 40 are oriented so that the major axes are directed in the thickness direction of the liquid crystal layer 40. The incident s-polarized light is not subjected to the modulation in the polarization direction while it makes a round trip in the liquid crystal layer 40 and goes out without being changed. On the other hand, in a state where the picture signal voltage is applied to the pixel electrode 110 of each of the pixel electrode parts PB, PR, and PG, the orientation of the liquid crystal molecules in the liquid crystal layer 40 of the region corresponding to the pixel electrode 110 to which the voltage is applied changes as shown in FIG. 6. The incident s-polarized light is therefore subjected to the modulation in such a manner that the polarization direction is turned 90 degrees while the light makes a round trip in the liquid crystal layer 40, and goes out as the p-polarized light from the liquid crystal layer 40. The polarization direction is turned 90 degrees by the birefringence of the liquid crystal layer 40 and by the fact such that the phase difference between a normal ray and an abnormal ray becomes equal to the half-wave length while the light makes a round trip in the liquid crystal layer 40. If the angle of rotation of the polarization direction can be controlled within a range from 0 to 90 degrees by setting the picture signal voltage to be applied to the pixel electrode part 12 to an intermediate value, the magnitude of the p-polarized light component passing through the PBS face 17a of the PBS 17 in the p/s mixture ray reflected by the liquid crystal panel 68 can be controlled, so that a half tone image can be expressed.

The colored rays in the p/s mixed state reflected by the liquid crystal panel 68 go back along the same optical paths, are reflected by the dichroic mirrors 66B, 66R, and 66G respectively as shown in FIG. 1, and enter the PBS 17. In the p/s mixture ray bundle incident on the polarization separation face 17a of the PBS 17, the s-polarized light is reflected towards the light source 11 and the p-polarized light transmits straight. The p-polarized ray bundle which has transmitted the PBS 17 is condensed by the projection lens 70 and projected onto the screen 71, thereby displaying a color image.

A comparative example of the liquid crystal panel 68 of the embodiment will now be described.

Figure 7:
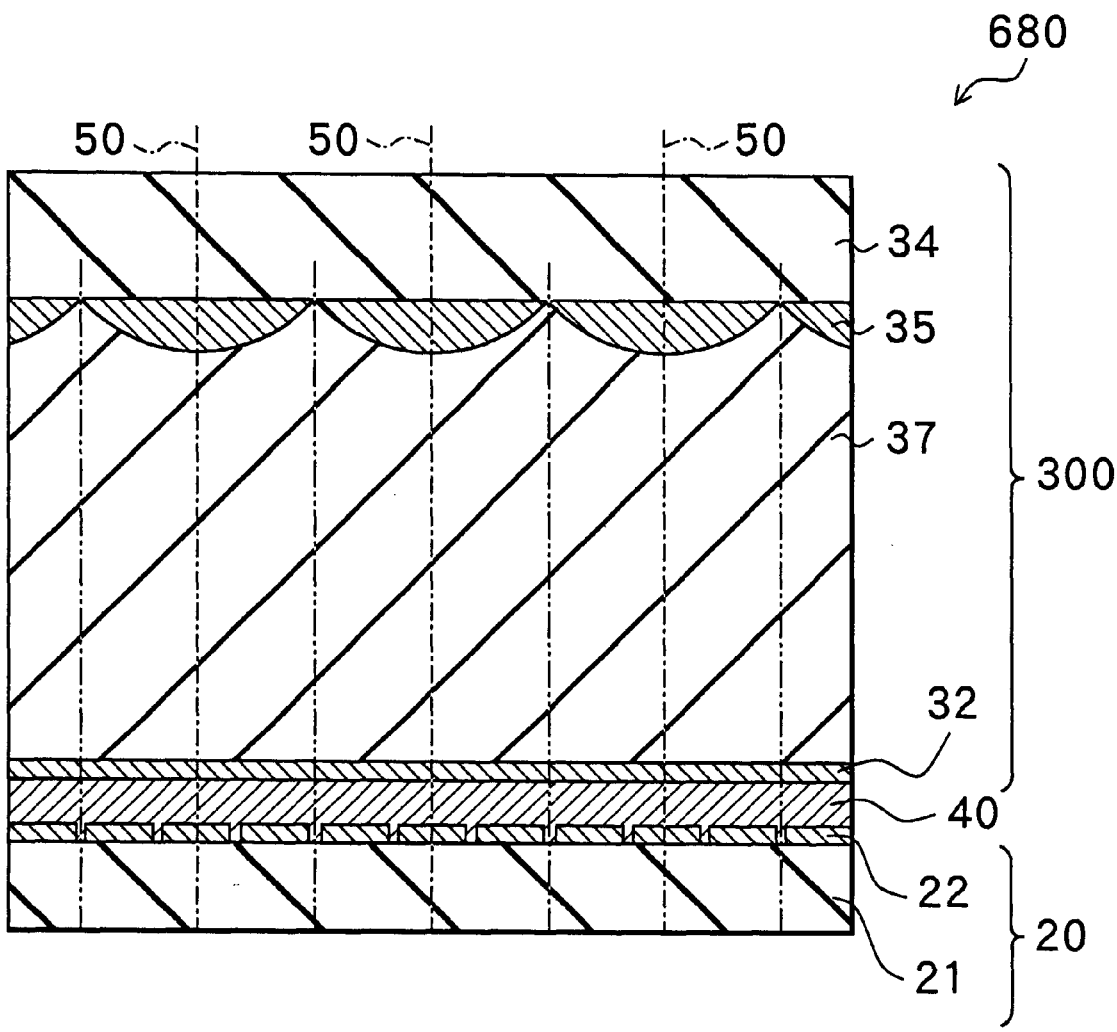
FIG. 7 is a cross section showing the construction of the main part of a liquid crystal panel as a comparative example.

FIG. 7 is a cross section of the structure of a liquid crystal panel 680 as a conventional example. In the drawing, the same components as those of FIG. 2 are designated by the same reference numerals. The liquid crystal panel 680 has only the microlens 35 in the liquid crystal panel 68 shown in FIG. 2 and does not have the microlens 33. That is, the liquid crystal panel 680 has a resin layer 37 having a single refractive index in place of the resin layers 36 and 31 in the liquid crystal panel 68. The other construction is similar to that of the liquid crystal panel 68 in FIG. 2.

Figure 8:
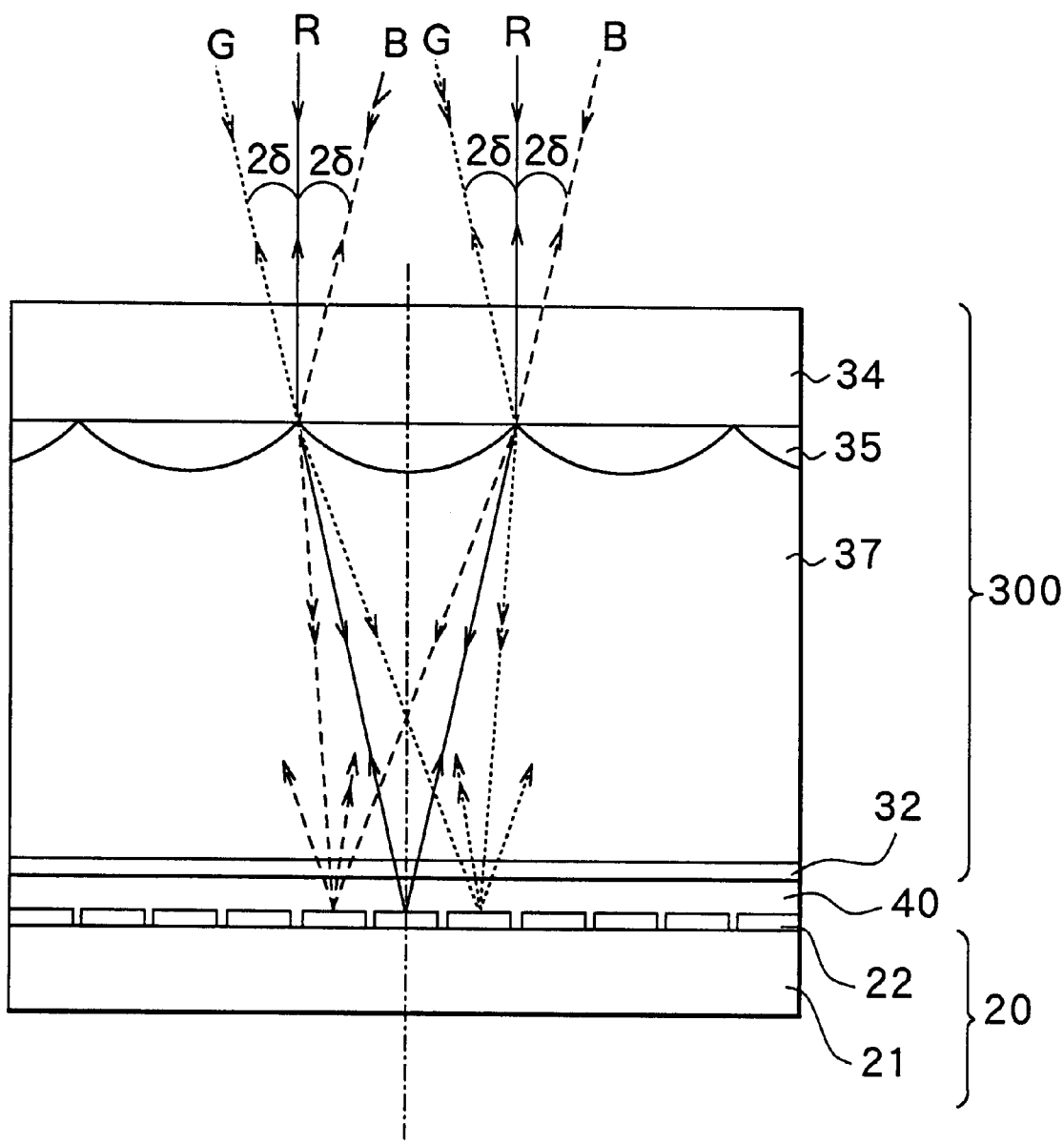
FIG. 8 is a diagram for explaining the operation of the liquid crystal panel shown in FIG. 7.

As shown in FIG. 8, in the liquid crystal panel 680 according to the conventional example, in a manner similar to the case of the liquid crystal panel 68 of the embodiment, the R ray which perpendicularly enters the liquid crystal panel 680 goes out perpendicularly and travels in the same direction as the incident direction. However, different from the liquid crystal panel 68, since the liquid crystal panel 680 does not have the microlens 33 for changing the travel direction, the B and G rays entering the panel 680 at angles of 2δ do not enter at angles where the principal rays are perpendicular to the pixel electrode parts PB and PG. A part of the reflection light travels towards the neighboring microlens 35. The B and G rays emitted from the liquid crystal panel 680 do not return the same incident optical paths but are dispersed or the angle of incidence to the dichroic mirrors 66B, 66R, and 66G (FIG. 1) changes. A ray bundle parallel to the optical axis 10' cannot be therefore obtained and a designed projection image cannot be formed on the screen 71.

On the contrary, according to the embodiment, in addition to the microlens 35, the microlens 33 is provided. The travel directions of the B and G rays condensed by the microlens 35 are changed by the microlens 33 so that the principal rays perpendicularly enter the pixel electrodes parts PB and PG, respectively. Consequently, the directions of the principal rays of the reflection rays from the pixel electrode parts PB and PG substantially coincide with the directions of the principal rays of the incident rays and become perpendicular to the pixel electrode parts PB and PG respectively. The reflection direction of each of the rays except for the principal ray become almost symmetrical to the direction of the corresponding incident ray with respect to the principal ray. Therefore, the direction of the outgoing light from the liquid crystal panel 68 (to be more accurate, the direction of the principal ray) of each color ray substantially coincides with the incident direction.

Moreover, in the embodiment, each color ray condensed by the microlenses 35 and 33 focuses on the corresponding pixel electrode part PB, PR, or PG. A relay optical system in which the magnification is equal to 1 is therefore constructed by microlenses 35 and 33. The rays reflected by the pixel electrode parts PB, PR, and PG are transformed by the same microlenses 35 and 33 into a parallel ray bundle, and the ray bundle goes out from the liquid crystal panel 68. That is, the outgoing ray of each color from the liquid crystal panel 68 is extracted as a parallel beam which does not diverge.

In the image projection display apparatus according to the embodiment as mentioned above, since the liquid crystal panel is constructed not as a transmission type but as a reflection type, the pixel electrode 110 as a reflection electrode can be formed on the TFT 100 or wiring as shown in FIG. 4. Consequently, the aperture ratio becomes larger than that of the conventional transmission type liquid crystal panel, and higher brightness is therefore achievable. According to the embodiment, besides the condenser microlens 35, the microlens 33 for changing the travel direction which is not included in the liquid crystal panel 680 of the comparative example (FIG. 7) is provided. By the microlens 33, the travel direction of the ray bundle condensed by the microlens 35 is changed so that the principal ray enters the pixel electrode part 22 almost perpendicularly. Thus, the light of each color reflected from the liquid crystal panel 68 travels in the incident direction and the reflection light can be easily led to the direction of the same optical path. Moreover, since the light condensed by the microlenses 35 and 33 focuses on the pixel electrode part 12, the color ray reflected by the liquid crystal panel 68 becomes a parallel beam and travels backward along the same optical path without dispersion. Each color ray entering the projection lens 70 via the PBS 17 also becomes a parallel ray bundle, so that it is easier to improve the efficiency for light utilization as compared with the case where the reflected light is divergent light. That is, the embodiment is advantageous to increase the brightness. Further, different from the conventional single-panel colorfilter type liquid crystal panel, a color filter is unnecessary, so that reduction in light amount and heat generation due to absorption in the color filter and the like can be suppressed.

Figure 9:
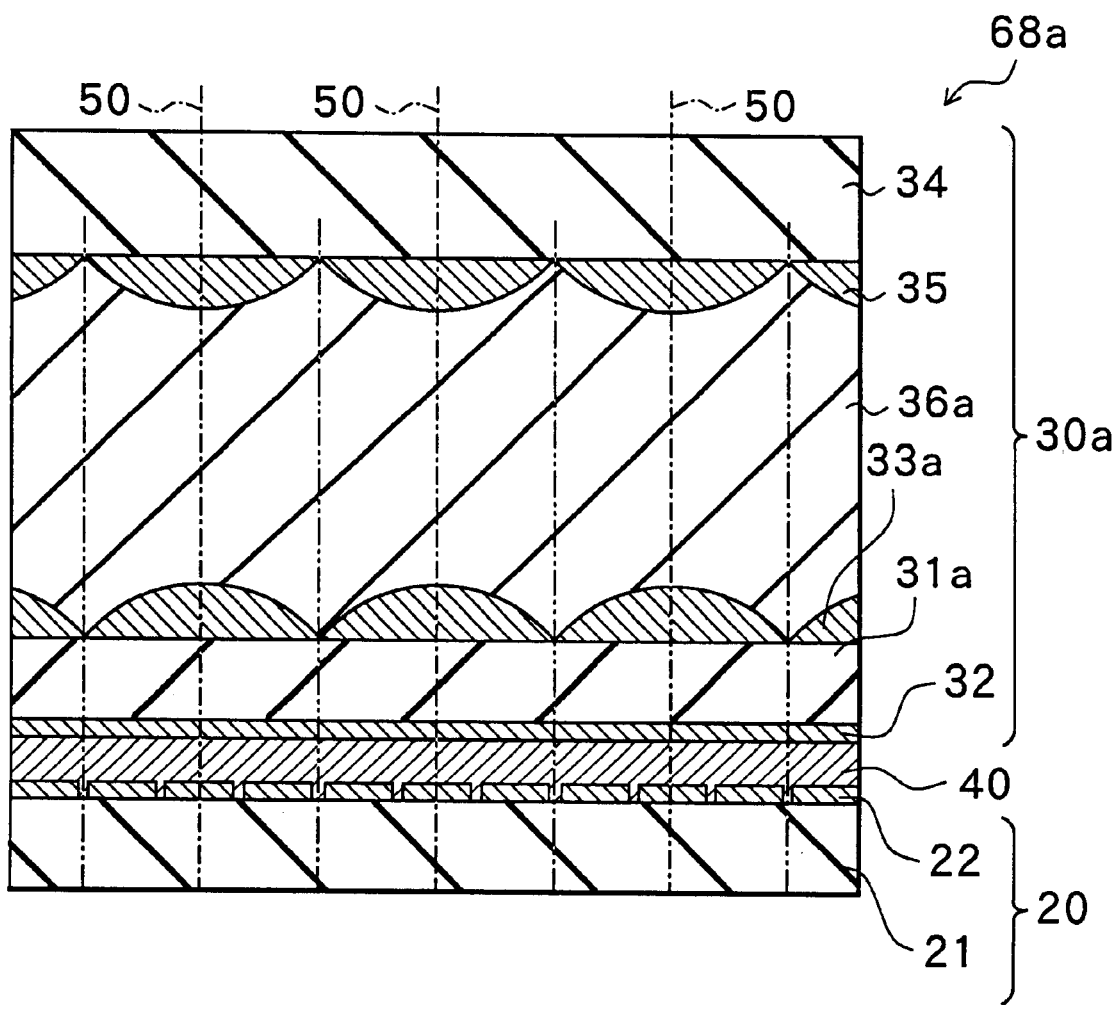
FIG. 9 is a cross section of a modification of the liquid crystal panel shown in FIGS. 2 and 3.
Figure 10:
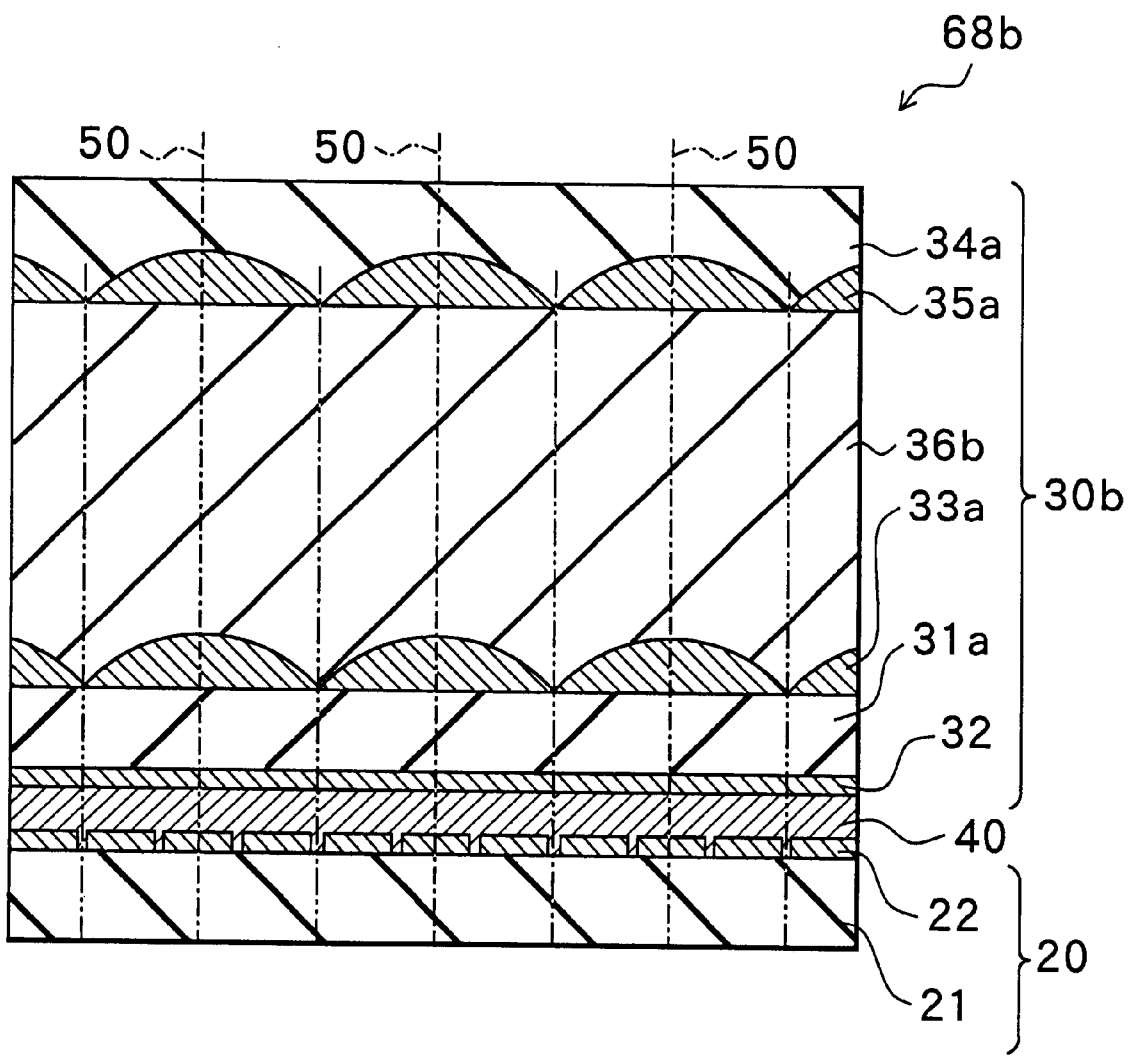
FIG. 10 is a cross section of another modification of the liquid crystal panel shown in FIGS. 2 and 3.
Figure 11:
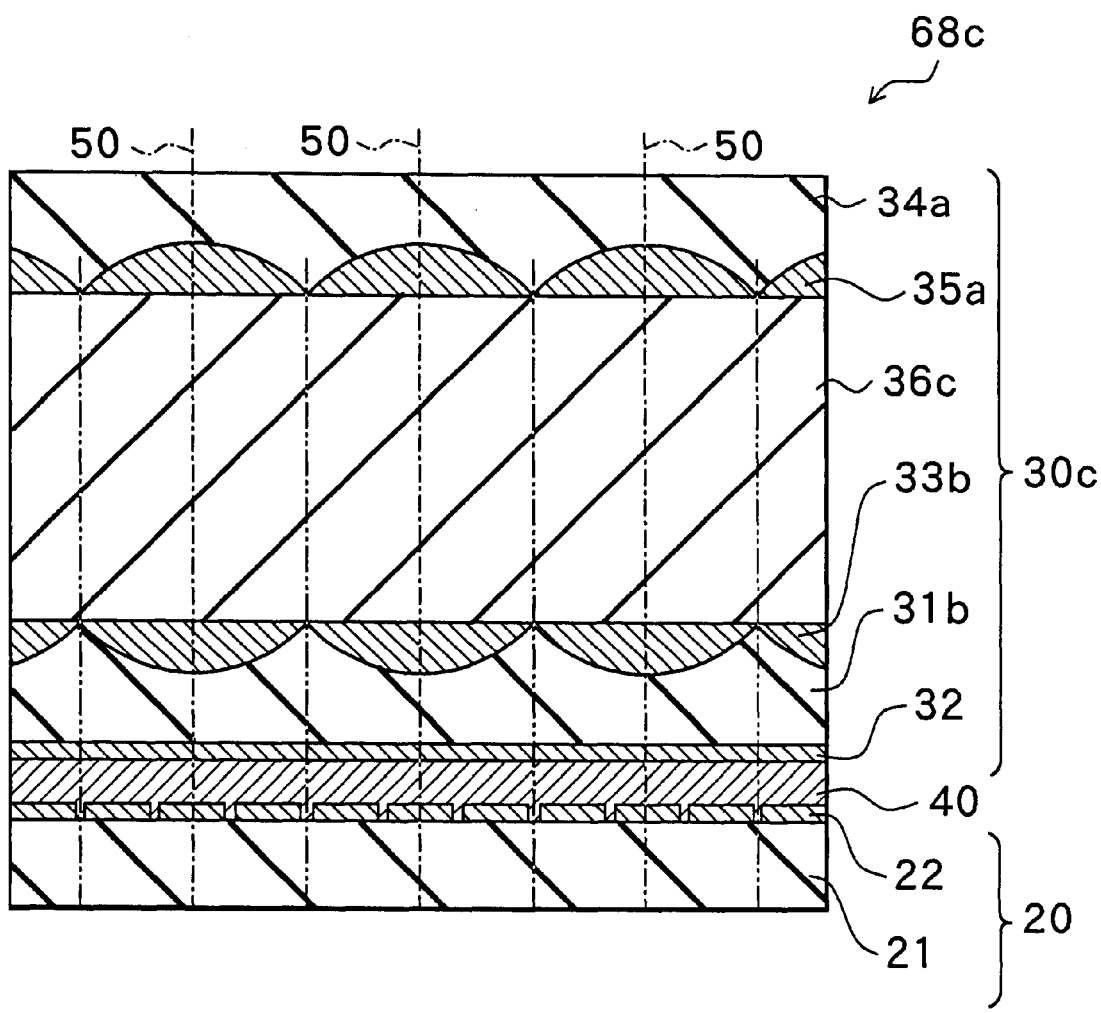
FIG. 11 is a cross section of further another modification of the liquid crystal panel shown in FIGS. 2 and 3.

In the liquid crystal panel 68 of the embodiment as shown in FIG. 2, each of the microlenses 35 and 33 is formed as a plano-concave lens having the concave face on the rear face side. Any of the constructions and forming methods as shown in FIGS. 9 to 11 and constructions and forming methods in which the layers shown in FIGS. 9 to 11 are arbitrarily combined can be also used. The same components as those in FIG. 2 are designated by the same reference numerals.

For example, as shown in FIG. 9, a liquid crystal panel 68a can be constructed by using a microlens 33a as a plano-concave lens having a concave on the front face side in place of the microlens 33 in the liquid crystal panel 68 in FIG. 2. In FIG. 9, a glass substrate 31a is disposed in place of the resin layer 31 in FIG. 2 and the microlens 33a made of a resin or the like is additionally formed on the front face side of the glass substrate 31a. For example, another arrangement in which a transparent resin substrate is used instead of the glass substrate 31a and the resin substrate and the microlens 33a are integrally formed can be also employed. In a manner similar to the resin layer 36 in FIG. 2, for example, a resin layer 36a in FIG. 9 can be formed as a resin layer for adhering the glass substrate 34 on which the microlens 35 is formed and the glass substrate 31a on which the microlens 33a is formed. It can be also formed by other methods. For instance, it is also possible to use a glass substrate in place of the resin layer 36a and form microlens faces on both sides of the glass substrate by etching.

As shown in FIG. 10, both of the microlenses 35a and 33a can be formed as plano-concave lenses each having a concave on the front face side. In the example of the diagram, in place of the glass substrate 34 and the microlens 35 in FIG. 9, a glass substrate 34a and a microlens 35a formed therein are provided. The other construction is similar to that of FIG. 9. In this case, the microlens 35a can be formed, for example, as a refractive index distribution type lens obtained by using a selective ion diffusion method for selectively diffusing predetermined ions from the rear face side of the glass substrate 34a. For example, a resin layer 36b in FIG. 10 can be also formed as a resin layer for adhesion for bonding the glass substrate 34a in which the microlens 35a is formed and the glass substrate 31a on which the microlens 33a is formed in a manner similar to the resin layer 36 in FIG. 2. It can be also formed by other methods. For instance, a glass substrate is used in place of the resin layer 36b and a microlens face is formed on the rear face side of the glass substrate by etching.

As shown in FIG. 11, it is also possible to form the microlens 35a as a plano-concave lens having a concave on the front face side and a microlens 33b as a plano-concave lens having a concave on the rear face side. In the example of the diagram, in place of the glass substrate 31a and the microlens 33a in FIG. 10, a glass substrate 31b and the microlens 33b formed in the front face side of the glass substrate 31b are produced. The other construction is similar to that of FIG. 10. In this case, for example, the microlens 33b can be formed by selectively diffusing predetermined ions from the front face side of the glass substrate 31b. In a manner similar to the resin layer 36 in FIG. 2, a resin layer 36c in FIG. 11 can be formed as a resin layer for adhesion for bonding the glass substrate 34a in which the microlens 35a is formed and the glass substrate 31b in which the microlens 33b is formed. It can be also formed by other methods. For example, in FIG. 11, instead of the resin layer 36c, the microlens 33b, and the glass substrate 31b, the resin layer 36 having the microlens 33 and the resin layer 31 can be formed as shown in FIG. 2. For instance, in place of the resin layer 36c, a glass substrate can be also employed.

[Second Embodiment]

A second embodiment of the invention will now be described.

Figure 12:
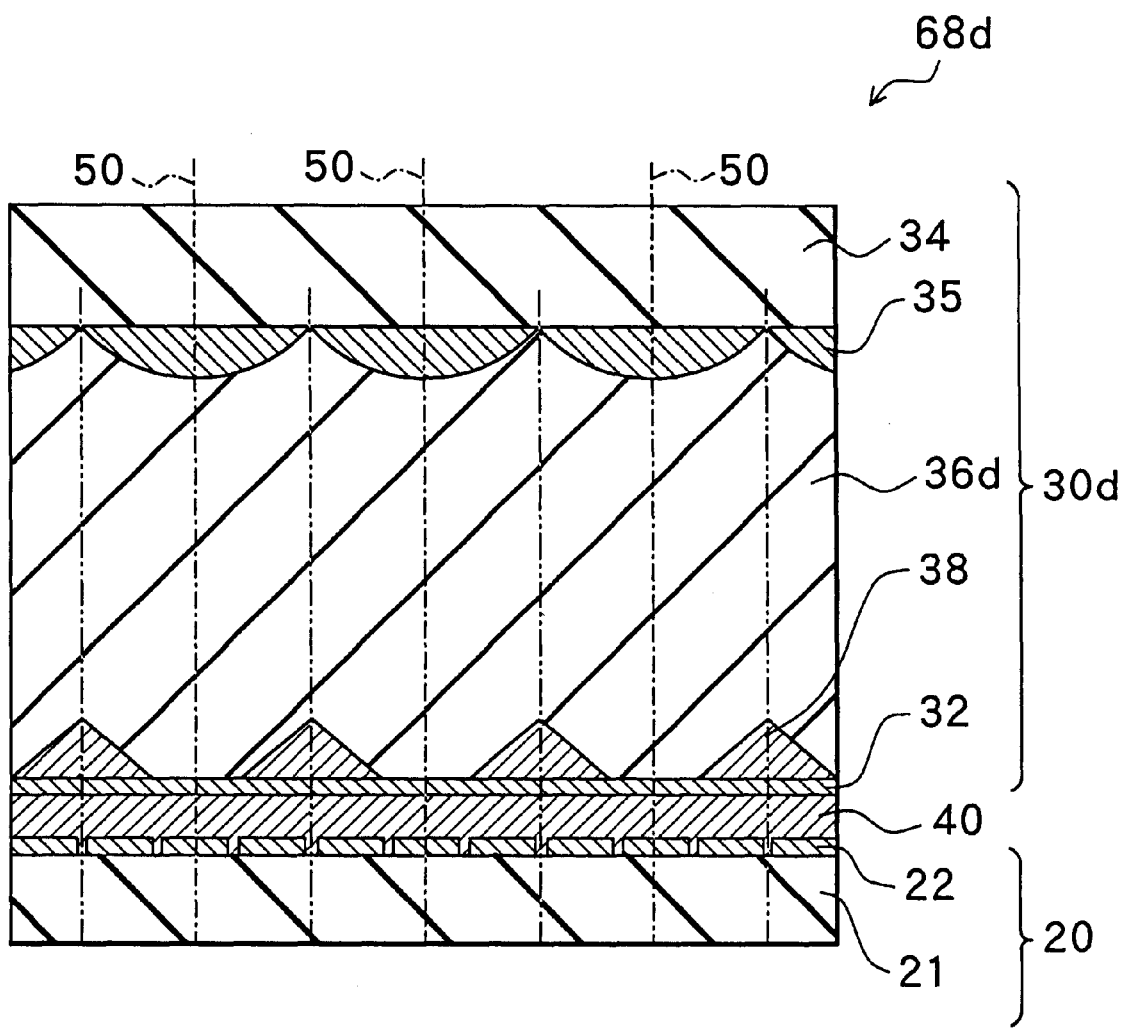
FIG. 12 is a cross section showing the structure of a main part of a liquid crystal panel used in an image projection display apparatus according to a second embodiment of the invention.

FIG. 12 is a cross section of the structure of the liquid crystal panel 68d for use in an image projection display apparatus according to the second embodiment of the invention. In the drawing, the same components as those of the first embodiment (FIG. 2) are designated by the same reference numerals and their description is omitted here. In a liquid crystal panel 68d, in place of the resin layers 31 and 36 in FIG. 2, a resin layer 36d in which microprisms 38 made of an organic resin or the like are selectively formed so as to be embedded in the rear face side is provided. Each microprism 38 is formed in such a manner that the edge extends in the direction which perpendicularly crosses the face of the drawing sheet at a position corresponding to the boundary of the microlens 35 and its bottom face substantially covers the pixel electrode parts PB or PG. The pixel electrode part PR is not covered with the microprism. Since the microprism 38 does not have the focal power (i.e., the light gathering power) in the embodiment, it is designed so that the focal point of the microlens 35 is on the pixel electrode part 22. The other construction of the liquid crystal panel 68d is similar to that of FIG. 2. The whole construction of the image projection is similar to that of FIG. 1. In place of the liquid crystal panel 68, the liquid crystal panel 68d is disposed. The microprism 38 corresponds to an example of the "prism" as "travel direction changing means" in the invention.

Figure 13:
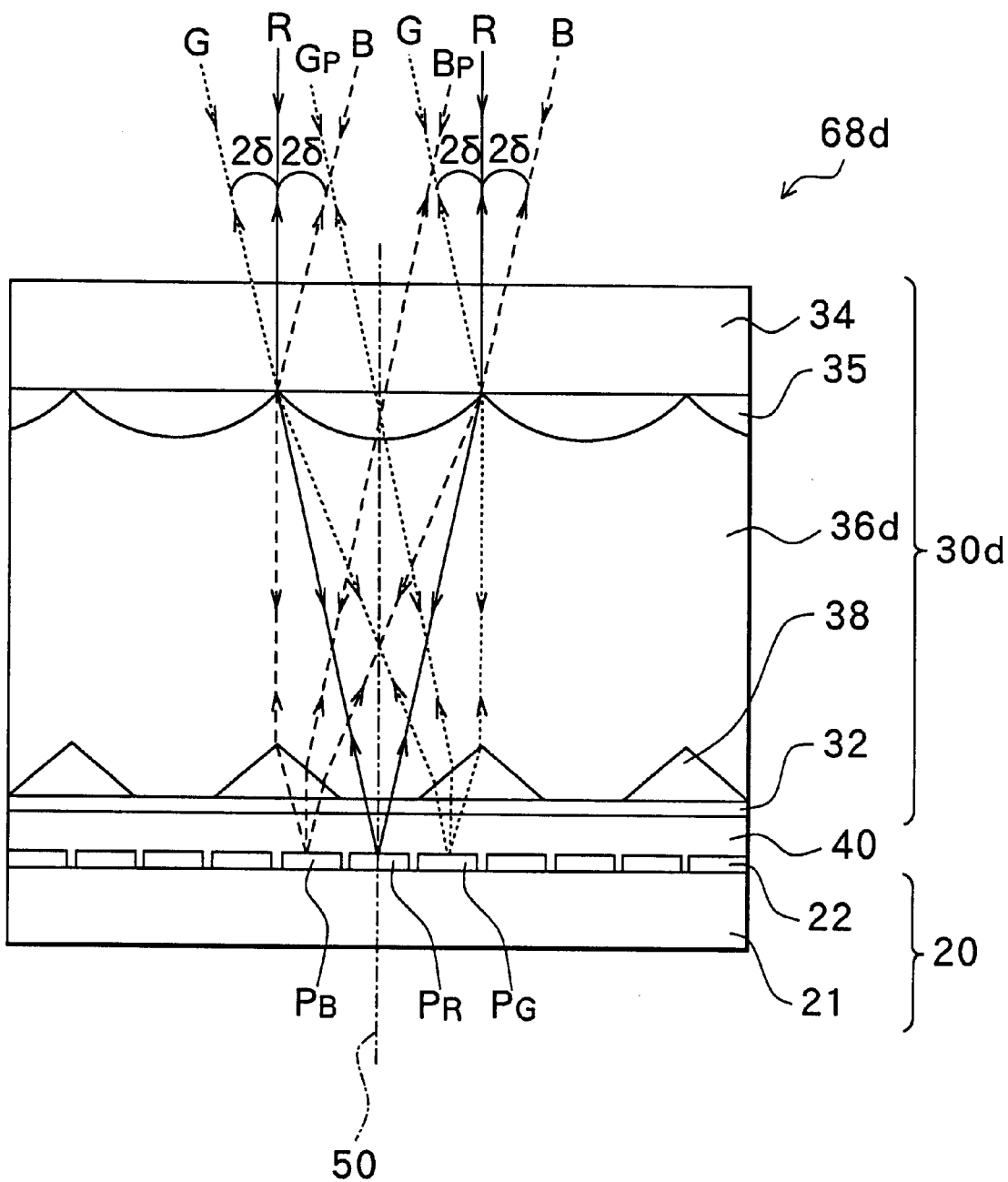
FIG. 13 is a diagram for explaining the operation of the liquid crystal panel shown in FIG. 12.

Referring to FIG. 13, the operation of the liquid crystal panel 68d having such a construction will be described. In the drawing, slashed lines indicative of a cross section are omitted.

FIG. 13 shows loci of the colored rays entering the liquid crystal panel 68d. As shown in the diagram, the R ray perpendicularly entering the liquid crystal panel 68d is condensed by the microlens 35, passes through the liquid crystal layer 40, and focuses in the central part of the pixel electrode part PR where the optical axis 50 extends. At this time, the central beam of the incident ray bundle perpendicularly enters the pixel electrode part PR and is reflected perpendicularly. Each of the incident beams other than the central beam is reflected by the pixel electrode part PR at an angle of reflection equal to the angle of incidence, travels backward along an optical path which is substantially the same as the optical path of incidence of another beam which enters symmetrically to the incident light with respect to the central beam, and goes out. The reflected beams pass through the same microlens 35, become parallel light, and go out perpendicularly from the liquid crystal panel 68d. The behavior of the R rays is similar in every microlens 35.

On the other hand, the B ray entering the liquid crystal panel 68d at an angle of 2δ from the incidence direction of the R ray (that is, the direction of the optical axis 50) is condensed by the microlens 35. After that, the travel direction is changed by the microprism 38 and the B ray focuses in an almost central part of the surface of the pixel electrode part PB. At this moment, the principal ray BP of the B ray enters the pixel electrode part PB almost perpendicularly and is reflected perpendicularly. Each of the incident rays except for the principal ray BP is reflected by the pixel electrode part PB at an angle of reflection equal to the angle of incidence, travels backward along the path which is almost the same as the optical path of another incident ray which enters symmetrical to the incident ray with respect to the principal ray BP, and goes out. The rays of reflection pass through the same microlens 35, become parallel light, and go out in the same direction as the incident direction of the B ray from the liquid crystal panel 68d. The behavior of the B rays is similar in every microlens 35.

The above behavior is similar with respect to the G ray entering the liquid crystal panel 68d at an angle of 2δ from the incidence direction of the R ray (that is, the direction of the optical axis 50). To be specific, the incident G ray is condensed by the microlens 35. After that, the travel direction is changed by the microprism 38 and the G ray focuses in an almost central part on the surface of the pixel electrode part PG. At this moment, the principal ray GP of the G ray enters the pixel electrode part PG almost perpendicularly and is reflected perpendicularly. Each of the incident rays except for the principal ray GP is reflected by the pixel electrode part PB at an angle of reflection equal to the angle of incidence, travels backward along the path which is almost the same as the optical path of another incident ray which enters symmetrical to the incident ray with respect to the principal ray GP, and goes out. The reflected rays pass through the same microlens 35, become parallel light, and go out from the liquid crystal panel 68d in the same direction as the incident direction of the G ray. The behavior of the G rays is similar in every microlens 35.

According to the embodiment as mentioned above, in addition to the microlens 35, the microprism 38 is provided. The travel directions of the B and G rays condensed by the microlens 35 are changed by the microprism 38 so that their principal rays perpendicularly enter the pixel electrode parts PB and PG, respectively. In a manner similar to the first embodiment, the outgoing light of each of the colored rays from the liquid crystal panel 68d is directed towards the direction of incidence. Moreover, each color ray condensed by the microlens 35 focuses on the corresponding pixel electrode part PB, PR, or PG through the microprism 38. Consequently, the microlens 35 and the microprism 38 construct a relay optical system having the magnification of 1. Each of the rays of light reflected by the pixel electrode parts PB, PR, and PG is transformed by the same microlens 35 into a parallel ray bundle, and transmitted through the liquid crystal panel 68d. That is, the outgoing light of each color from the liquid crystal panel 68d is extracted as parallel light which does not diverge.

In consideration of the following points, however, it is suitable to use the microlens 33 as in the first embodiment more than the microprism 38 as the travel direction changing means as in the second embodiment. First, in the case of forming the lens and prism by using a resin material, generally, it is difficult to form the prism more than the lens. Especially, it is not easy to form the prism by etching. Second, in the case of using the microlens 33 as the travel direction changing means as in the first embodiment, almost all rays of light converge to a focal point on the pixel electrode part 22 as long as the ray bundle converged by the microlens 35 enters any part of the microlens 33. On the other hand, in the case of using the refracting behavior of the microprism 38 as in the second embodiment, the ray bundle converged by the microlens 35 has to enter one of the oblique surfaces of the microprism 38 because light which does not enter the oblique surface but enters the other oblique surface or an area where no microprism 38 exists diverges and is not used. The first embodiment has the condition of small spot size of the light focused by the microlens 35, which is less strict than the second embodiment.

Although the invention has been described above with the embodiments, the invention is not limited to the foregoing embodiments but can be variously modified. For example, although the arrangement in which each of the colored rays condensed by the microlens 35 or the like focuses on the pixel electrode part 12 and is reflected therefrom is used in the foregoing embodiments, the invention is not limited to that arrangement. It is also possible to be constructed so that the color ray is reflected by the pixel electrode part 12 before or after the ray of color light focuses. In this case, the ray bundle of each color going out from the liquid crystal panel 68 does not become a parallel ray bundle, however, the direction of the principal ray of the ray bundle of each color almost coincides with the direction of the corresponding incident ray bundle. There is also a case that the focal point is desired to be rather in a rearward position of the pixel electrode part 12 depending on conditions. In such a case, a lens having a larger F number i.e., lower brightness can be used as the projection lens 70.

Although the pixel electrode 110 (FIG. 4) itself is constructed as the electrode having a high reflectance and incident light is reflected by the surface of the pixel electrode 110 in the above embodiments, the invention is not limited to that arrangement. An alternative arrangement such that the pixel electrode is formed as a transparent electrode and a reflection layer made of aluminum (Al) or the like is formed on the rear face (lower layer) of the pixel electrode can be used. In the foregoing embodiments, the glass substrate 21 which is transparent for the colored rays is used as the base of the liquid crystal panel 68. In place of the glass substrate 21, a single-crystal silicon substrate which is opaque for the colored rays can be also used. Since the liquid crystal panel 68 is not of the transmission type but the reflection type, it is unnecessary to transmit light. In the case of using the single-crystal silicon substrate (silicon wafer) as mentioned above, a MOS transistor can be manufactured instead of the TFT 100 (FIG. 4) by using a general semiconductor manufacturing apparatus and process. Thus, the liquid crystal panel can be produced easier than the case of forming the TFT on the glass substrate.

Figure 14:
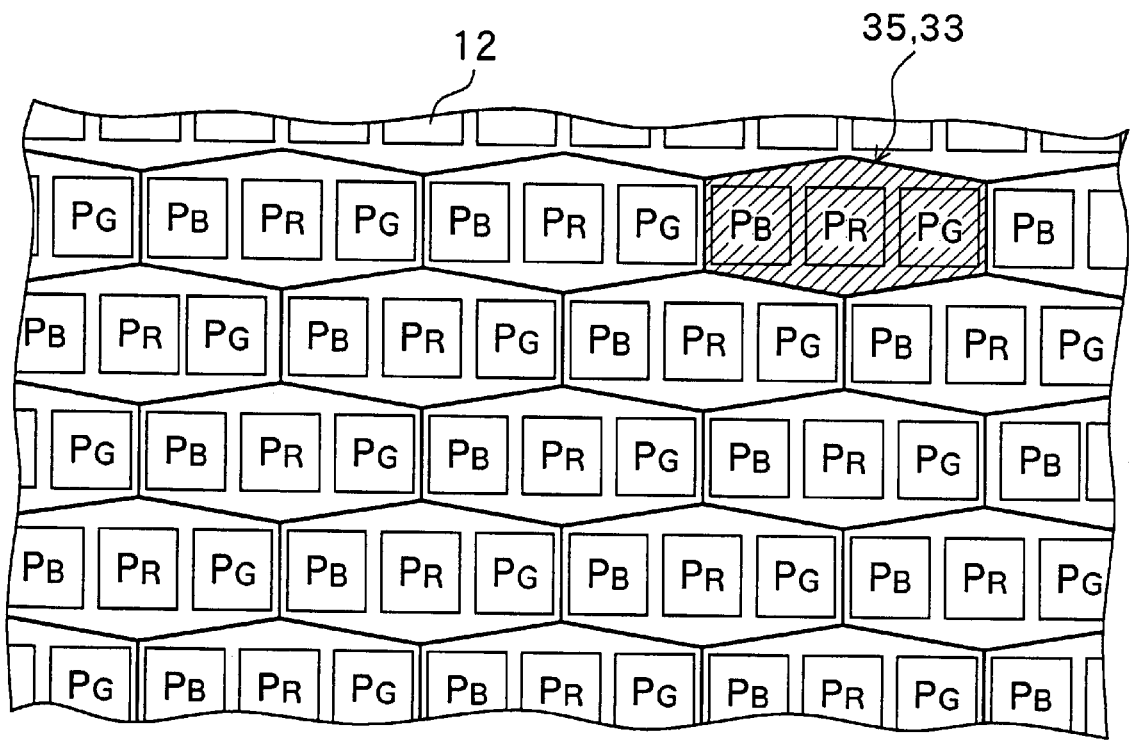
FIG. 14 is a plan view showing another arrangement of pixel electrodes and microlenses in the liquid crystal panel shown in FIG. 2 and FIGS. 9 to 12.

Although the pixel electrode parts PB, PR, and PG for the three colors are arranged in stripes as shown in FIG. 3 and the outline shape (plan view) of the microlenses 35 and 33 is rectangular in the first embodiment, other arrangements can be also employed. For example, as shown in FIG. 14, the pixel electrode parts PB, PR, and PG can be arranged in delta and the outline of the microlenses 35 and 33 may have a hexagonal shape. The other arrangements (such as diagonal mosaic arrangement) and shapes can be also used.

Figure 15:
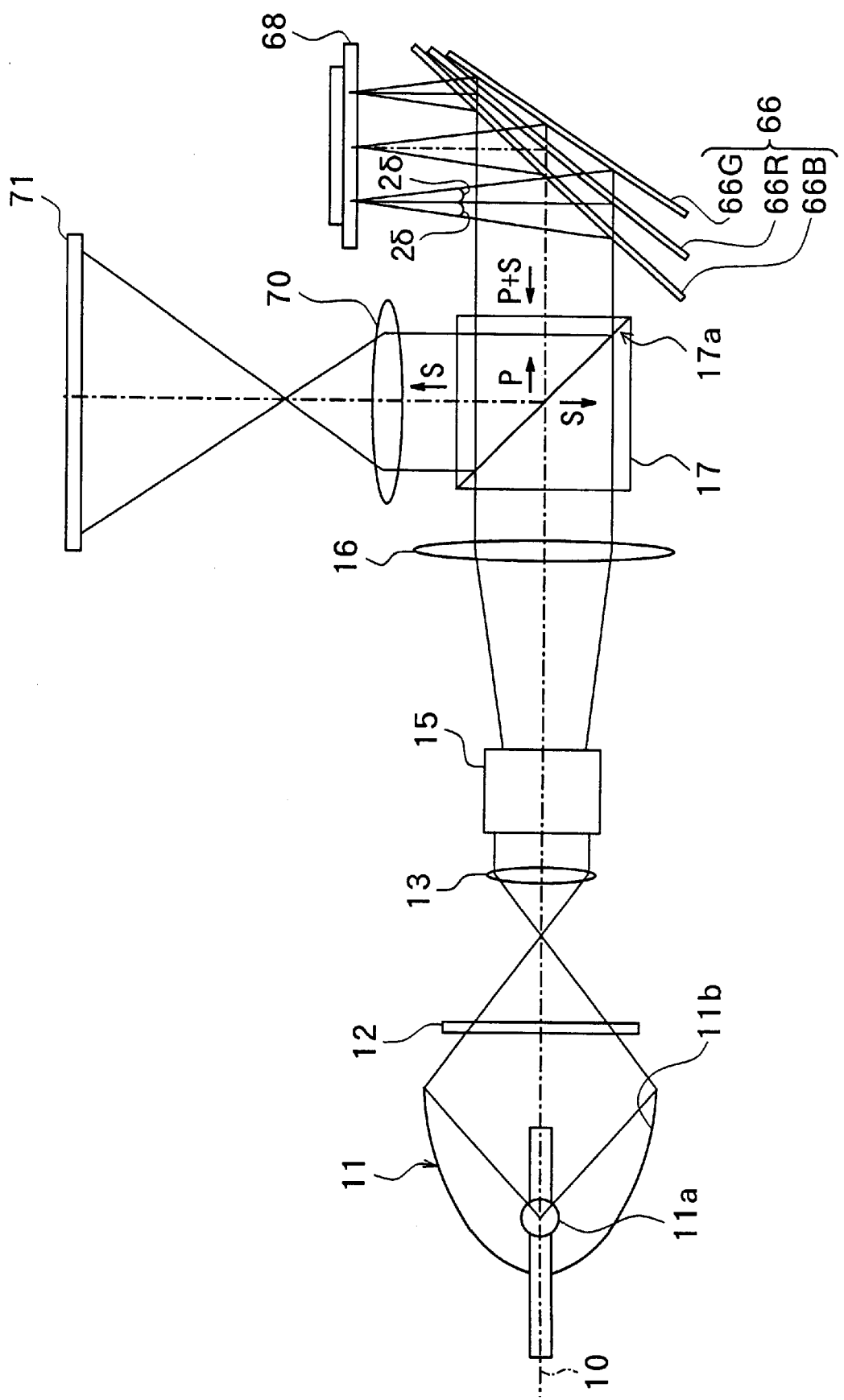
FIG. 15 is a plan view of a modification of the optical system of the image projection display apparatus shown in FIG. 1.

In the foregoing embodiments, the color separation is performed by the dichroic mirrors 66B, 66R, and 66G by using the s-polarized ray bundle in the linear polarized light separated by the PBS 17 and the colored rays are led to the liquid crystal panel 68 or the like. Besides the arrangement, as shown in FIG. 15 for example, the p-polarized ray bundle can be used. In this case, as shown in the diagram, the dichroic mirrors 66B, 66R, and 66G are sequentially arranged on the optical axis 10 in rearward positions of the PBS 17 and the liquid crystal panel 68 or the like is disposed in the direction which perpendicularly crosses the optical axis 10. The other construction is similar to that of FIG. 1. When it is constructed in such a manner, in the p/s mixture of polarized light reflected from the liquid crystal panel 68, the ray bundle which passes through the PBS 17 and reaches the projection lens 70 to contribute image display is the s-polarized ray bundle.

Figure 16:
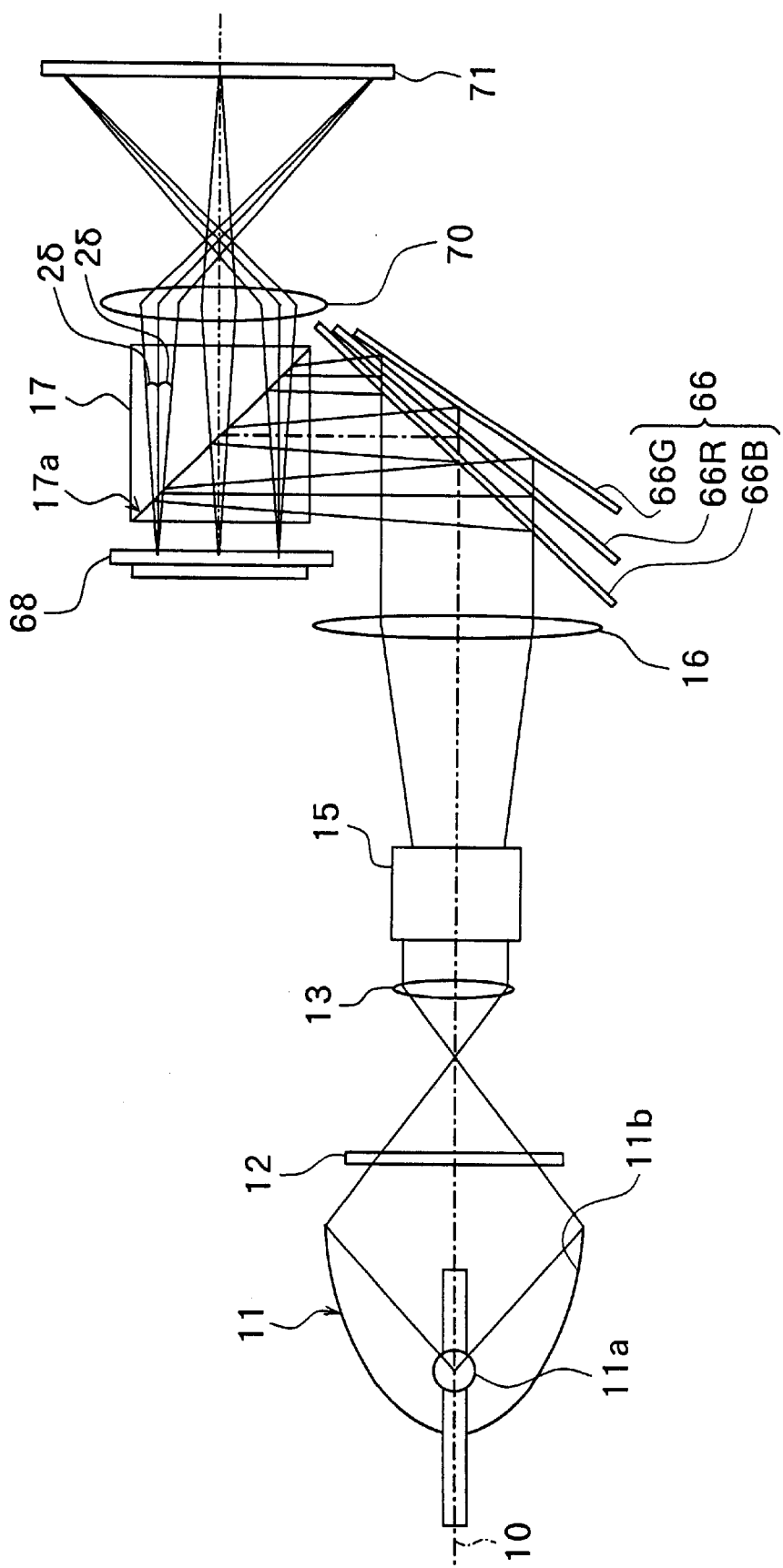
FIG. 16 is a plan view of another modification of the optical system of the image projection display apparatus shown in FIG. 1.

In the foregoing embodiments, the outgoing light from the condenser lens 16 is separated by the PBS 17 into the p-polarized light and the s-polarized light and then the s-polarized light (p-polarized light in the modification shown in FIG. 15) is separated into the three colored rays by the dichroic mirrors 66B, 66R, and 66G. Besides the above, as shown in FIG. 16 for example, another arrangement can be also used in which the outgoing light from the condenser lens 16 is subjected to the color separation by the dichroic mirrors 66B, 66R, and 66G into the three colors, each color ray is separated by the PBS 17 into the p- and s-polarized beams, and one of the polarized beams is directed to the liquid crystal panel 68. In this case, as shown in the drawing, it is sufficient to sequentially arrange the dichroic mirrors 66B, 66R, and 66G in rearward positions of the condenser lens 16 along the optical axis 10 and dispose the PBS 17 in the direction which almost perpendicularly crosses the optical axis 10. In this case, there are two methods. According to one of the methods, as shown in the drawing, the liquid crystal panel 68 is disposed in the direction which almost perpendicularly crosses the optical axis extending through the PBS 17 and the dichroic mirrors 66B, 66R, and 66G and the s-polarized light is used. According to the other method, although not illustrated, the liquid crystal panel 68 is disposed in a rearward position of the PBS 17 on the optical axis extending the PBS 17 and the dichroic mirrors 66B, 66R, and 66G and the p-polarized light is used. In the example shown in FIG. 16, different from the cases of FIGS. 1 and 15, the colored rays enter the projection lens 70 at an angle of 2δ to each other and the color synthesis is performed on the screen 71 by the projection lens 70, so that there is the possibility that the chromatic aberration becomes large. In consideration of this point, it can be said that the arrangement shown in the first and second embodiments (FIGS. 1 and 15) is more preferable.

Although not shown in FIGS. 1, 15, and 16, a so-called p/s separating and synthesizing device can be inserted at some midpoint in the optical path extending from the light source 11 to the PBS 17. The p/s separating and synthesizing device separates the p/s mixture ray bundle into the p-polarized light and s-polarized light by a polarizing and separating prism or the like, rotates the polarization direction of one (for example, s-polarized light) of the light beams by 90 degrees by using a phase plate such as a half-wave plate so as to transform the polarized light to the same polarized state of the other polarized light (p-polarized light in this case), and combines and sends the two polarized ray bundles (in this case, the p-polarized light). The details are described in, for example, Japanese Patent Application No. 10-4260 by the applicant of the present invention. In the case of using the p/s separating and synthesizing device, most of the rays emitted from the light source can be transformed to linear by polarized light in the single polarization direction (s- or p-polarized light) while hardly damaging the light and the resultant light can be sent to the PBS 17. Consequently, the light amount in the PBS 17 is hardly lost and the brightness can be further increased. Since the ray bundle which has been preliminarily changed into the almost single polarization direction by the p/s separating and synthesizing device is transmitted to the PBS 17 and then the p/s separation is performed, the accuracy of the p/s separation is improved and it is effective to improve the picture quality.

Although the liquid crystal layer is used as the light modulating means in the foregoing embodiments, the invention is not limited to the liquid crystal layer. As long as light from the outside is reflected and modulated in accordance with a picture signal and the modulated light can be transmitted, the invention is applicable to a display system using modulating means of another type.

Although the case where the liquid crystal panel 68 or the like operates in the electric field control birefringence (ECB) mode in the image projection display apparatus according to the foregoing embodiments has been described, the invention can be applied to a case where the liquid crystal panel 68 or the like operates in other modes.

Although B, R, and G are used as the three primary colors for color display in the above-described embodiments, combination of other basic colors (such as cyan (C), magenta (M), yellow (Y)) can be also employed.

According to the optical modulator or the image projection display apparatus of the invention as described above, the colored rays entering from different directions are condensed in the directions corresponding to the respective incident directions by the condensing means provided every plurality of pixel electrodes. The travel direction of each condensed ray bundle is changed so that the principal ray becomes perpendicular to the surface of reflection of the pixel electrode by the travel direction changing means. The ray bundle is allowed to enter the corresponding pixel electrode and reflected, during which each of the colored rays is modulated according to the picture signal applied to the pixel electrode. Consequently, the direction of the principal ray of the reflection light of each color substantially coincides with the direction of the principal ray of the corresponding incident light and becomes almost perpendicular to the pixel electrode surface. The reflection direction of the rays except for the principal ray becomes almost symmetrical to the direction of the corresponding incident light with respect to the principal ray. The ray bundle of each of the colored rays going out from the optical modulator is directed toward the incident direction. That is, the travel direction of the reflected ray bundle can be almost overlapped with the direction of the incident ray bundle. Thus, although it is of the single-panel and reflection type, the image projection display apparatus which can display a color image can be easily realized. Especially, by adopting the reflection type, the pixel electrodes can be formed above a drive area (i.e., black matrix area) so as to be overlapped. In the drive area, switching devices and the like for selectively applying the picture signal voltage to the pixel voltage are formed. The aperture ratio can be therefore made larger than the case of the conventional transmission single-panel color filter type display system, and higher brightness can be realized. By using the single-panel type, the degree of freedom of arranging the components of the image projection display apparatus becomes higher as compared with the conventional triple-panel display. The display can be made smaller and assembly and adjustment is facilitated. Different from the conventional single-panel color filter type display, no color filter is necessary. The reduction in light amount and heat generation by absorption and the like can be suppressed. The above point is also advantageous to realize higher brightness. Since the mechanism for cooling the optical modulator can be omitted, the system can be made more compact.

Especially, in the optical modulator according to one aspect of the invention, the condensing means and the travel direction changing means are constructed by the first and second lenses, respectively. The distance between the first and second lenses is almost equal to the focal point of the second lens as well as the synthesized focal point of the first and second lenses is set to be on or around the pixel electrode. Consequently, the condensing means and the travel direction changing means construct the relay optical system. Each of the colored rays reflected from the surface of the pixel electrode travels backward along the path symmetrical to the incident light with respect to the principal light and goes out. For example, when the parallel light is used as incident light, the colored rays transmitted from the optical modulator also become parallel light and do not diverge. Effects such that the efficiency for light utilization is improved and the brightness can be increased are therefore produced.

In the optical modulator according to another aspect of the invention, the travel direction changing means is constructed by the prism which enables each color ray condensed by the condensing means to focus on or near the pixel electrode for the corresponding color ray. Thus, in a manner similar to the above optical modulator, the reflected light can be prevented from being diverged and the effect such that brightness can be increased is produced.

Obviously many modifications and variations of the present invention are possible in the light of the above teachings. It is therefore to be understood that within the scope of the appended claims the invention may be practiced otherwise than as specifically described.

What is claimed is:

1. An optical modulator, comprising:
   a plurality of pixel electrodes two-dimensionally arranged in correspondence with a plurality of colored rays and formed so as to be capable of reflecting incident light;
   a first microlens which is disposed on a glass substrate in a position facing every group of the pixel electrodes arranged in correspondence with the plurality of colored rays and condenses colored rays entering from different directions into directions corresponding to incident directions;
   a second microlens for changing the travel direction each color ray condensed by the condensing means so that the principal ray becomes perpendicular to the reflection surface of the pixel electrode, allowing the ray to go out, and allowing each of said plurality of color rays to enter the corresponding pixel electrode;
   a polarization beam splitter, located between a light source which provides said plurality of colored rays and said plurality of pixel electrodes, whereby said polarization beam splitter reflects only s-polarized light toward a set of dichroic mirrors but transmits p-polarized light unchanged;
   a liquid crystal layer, having a plurality of counter electrodes formed therein, for modulating each color ray going out from the travel direction changing means and reflected by the pixel electrode, in accordance with a picture signal applied to the pixel electrode.

2. The optical modulator according to claim 1, wherein, the distance between the first and second microlenses is substantially equal to the focal distance of the second microlens, and a synthetic focal point of the first and second microlenses is on or near the pixel electrode.

3. The optical modulator according to claim 1, wherein a prism is substituted for the second microlens which enables each color ray condensed by the first microlens to focus on or near the pixel electrode for the corresponding color ray.

4. The optical modulator according to claim 1, wherein the plurality of colored rays comprise three colored rays of the color display obtained from white light by color separation,
   wherein one of the colored rays perpendicularly enters the first microlens and each of the other two colored rays enters the first microlens with a predetermined angle to the incident direction of the one of the colored rays.

5. The optical modulator of claim 1, further comprising:
   said microlens is integrally formed as part of a resin layer and has a flat front face and a concave rear face.

6. The optical modulator of claim 1, further comprising:
   each of said pixel electrodes comprises a thin film transistor polysilicon active layer, a gate insulating film, and gate, drain, and source electrodes.

7. The optical modulator of claim 6, further comprising:
   each of said pixel electrodes is covered with an insulating layer having contact holes reaching said drain and source electrodes, which are covered with a planarization layer upon which a photosensitive organic black layer is located.

8. The optical modulator of claim 6, further comprising:
   said pixel electrodes are each connected to said source electrodes through a connection plug embedded in a contact hole penetrating both the planarization and organic black layers, and said drain electrodes are connected to a data line and said gate electrodes are connected to an address line.

9. The optical modulator of claim 1, further comprising:
   while said picture signal is applied to said pixel electrode, a tilt angle of molecules within said liquid crystal layer becomes 45 degrees and then increases to 90 degrees toward either the pixel electrode or counter electrode, resulting in the turning of incident s-polarized light by 90 degrees so that said incident s-polarized light exits the liquid crystal layer as p-polarized light.

10. An image projection display apparatus comprising:
    color ray generating means for generating a plurality of colored rays;
    an optical modulator for reflecting colored rays emitted from the color ray generating means and performing an optical modulating to each of the colored rays in accordance with a picture signal;

a polarization beam splitter, located between said color ray generating means and said optical modulator; whereby said polarization beam splitter reflects only s-polarized light toward a set of dichroic mirrors but transmits p-polarized light unchanged; and a projection lens for projecting each of the colored rays reflected and modulated by the optical modulator onto a screen; wherein the optical modulator comprises:

a plurality of pixel electrodes two-dimensionally arranged in correspondence with the plurality of colored rays and formed so as to be capable of reflecting incident light;

a first microlens which is disposed on a glass substrate in a position facing every group of pixel electrodes arranged in correspondence with the plurality of colored rays and condenses colored rays entering from different directions into directions corresponding to the incident directions;

a second microlens for changing the travel direction of each color ray condensed by the condensing means so that the principal ray of the color ray becomes perpendicular to the reflection surface of the pixel electrode and allowing the color ray to go out and enter the corresponding pixel electrode; and a liquid crystal layer for modulating each color ray going out from the second microlens and reflected by the pixel electrode, in accordance with a picture signal applied to the pixel electrode.

11. The image projection display apparatus according to claim 10, wherein the distance between the first and second microlenses is almost equal to a focal distance of the second microlens, and a synthetic focal point of the first and second microlenses is on or near the pixel electrode.

12. The image projection display apparatus according to claim 10, wherein a prism is substituted for the second microlens, which enables each of colored rays condensed by the first microlens to focus on or near the pixel electrode for the corresponding color ray.

13. The image projection display apparatus according to claim 10, wherein the plurality of colored rays of the color display comprise three colored rays obtained from white light by color separation, one of the colored rays perpendicularly enters the first microlens, and each of the other two colored rays enters the first microlens at a predetermined angle to the incident direction of the one of the colored rays.

14. The optical modulator of claim 10, further comprising:

said microlens is integrally formed as part of a resin layer and has a flat front face and a concave rear face.

15. The optical modulator of claim 10, further comprising:

each of said pixel electrodes comprises a thin film transistor polysilicon active layer, a gate insulating film, and gate, drain, and source electrodes.

16. The optical modulator of claim 15, further comprising:

each of said pixel electrodes is covered with an insulating layer having contact holes reaching said drain and source electrodes, which are covered with a planarization layer upon which a photosensitive organic black layer is located.

17. The optical modulator of claim 15, further comprising:

said pixel electrodes are each connected to said source electrodes through a connection plug embedded in a contact hole penetrating both the planarization and organic black layers, and said drain electrodes are connected to a data line and said gate electrodes are connected to an address line.

18. The optical modulator of claim 10, further comprising:

while said picture signal is applied to said pixel electrode, a tilt angle of molecules within said liquid crystal layer becomes 45 degrees and then increases to 90 degrees toward either the pixel electrode or counter electrode, resulting in the turning of incident s-polarized light by 90 degrees so that said incident s-polarized light exits the liquid crystal layer as p-polarized light.

* * * * *